Nov. 14, 1939.   W. SYKES   2,179,802
APPARATUS FOR PRODUCING BEAMS, COLUMNS, OR THE LIKE
Filed Oct. 17, 1935   20 Sheets-Sheet 6
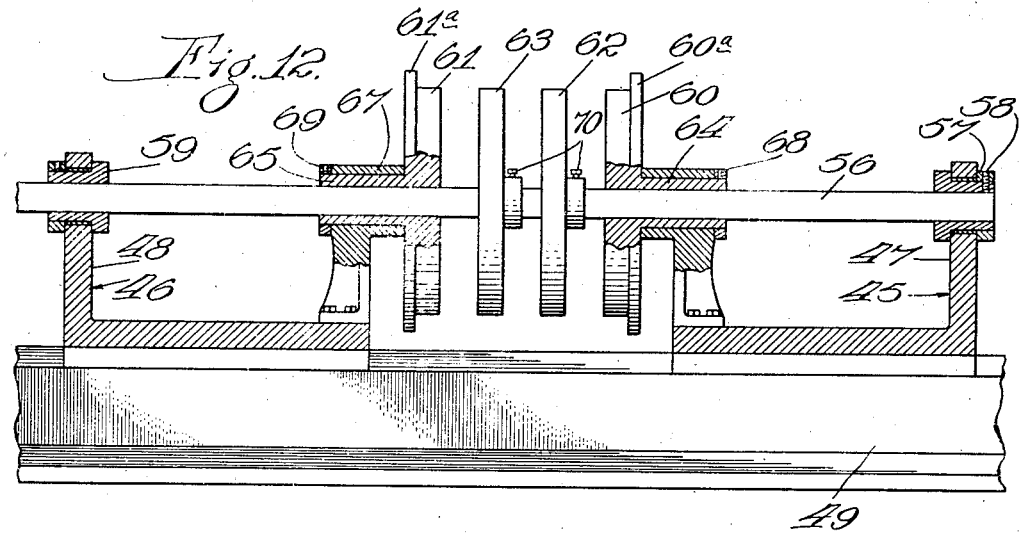
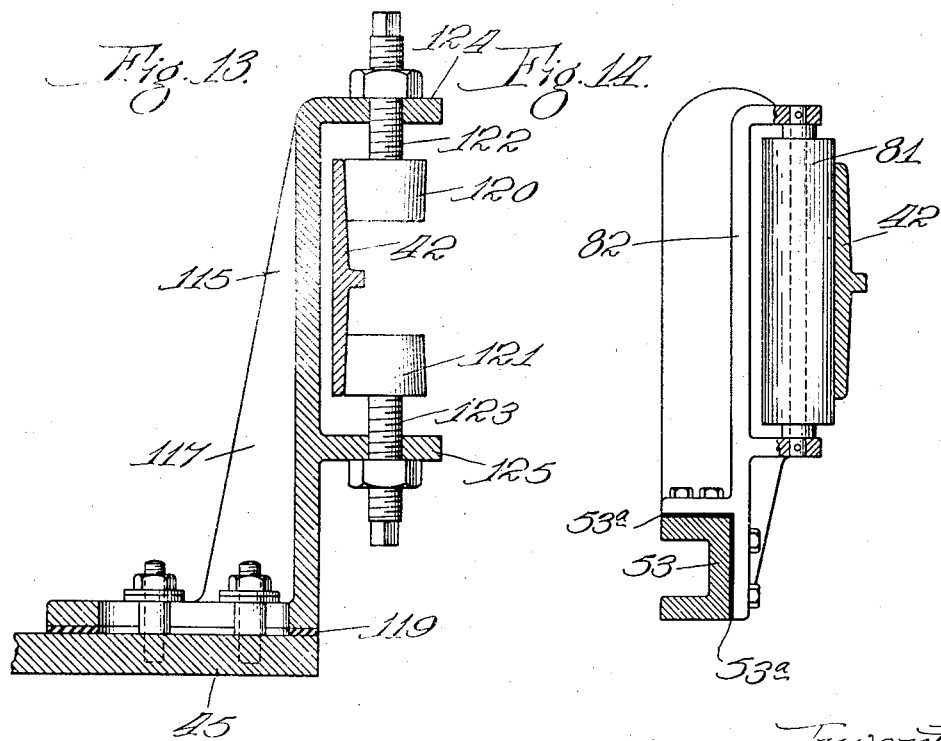
Inventor:
Wilfred Sykes.
By Dyrenforth, Lee, Chritton & Wiles,
Attys.

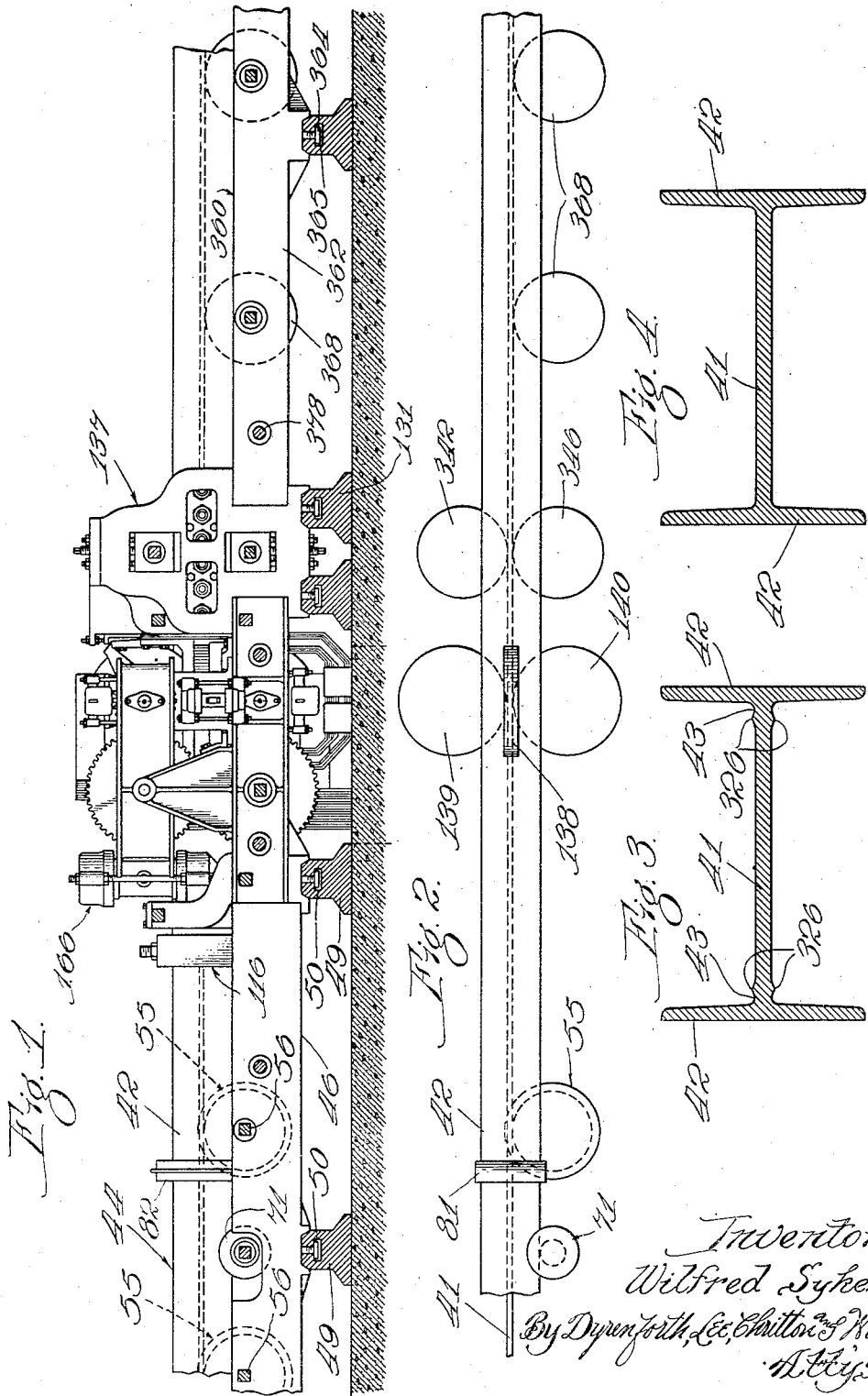

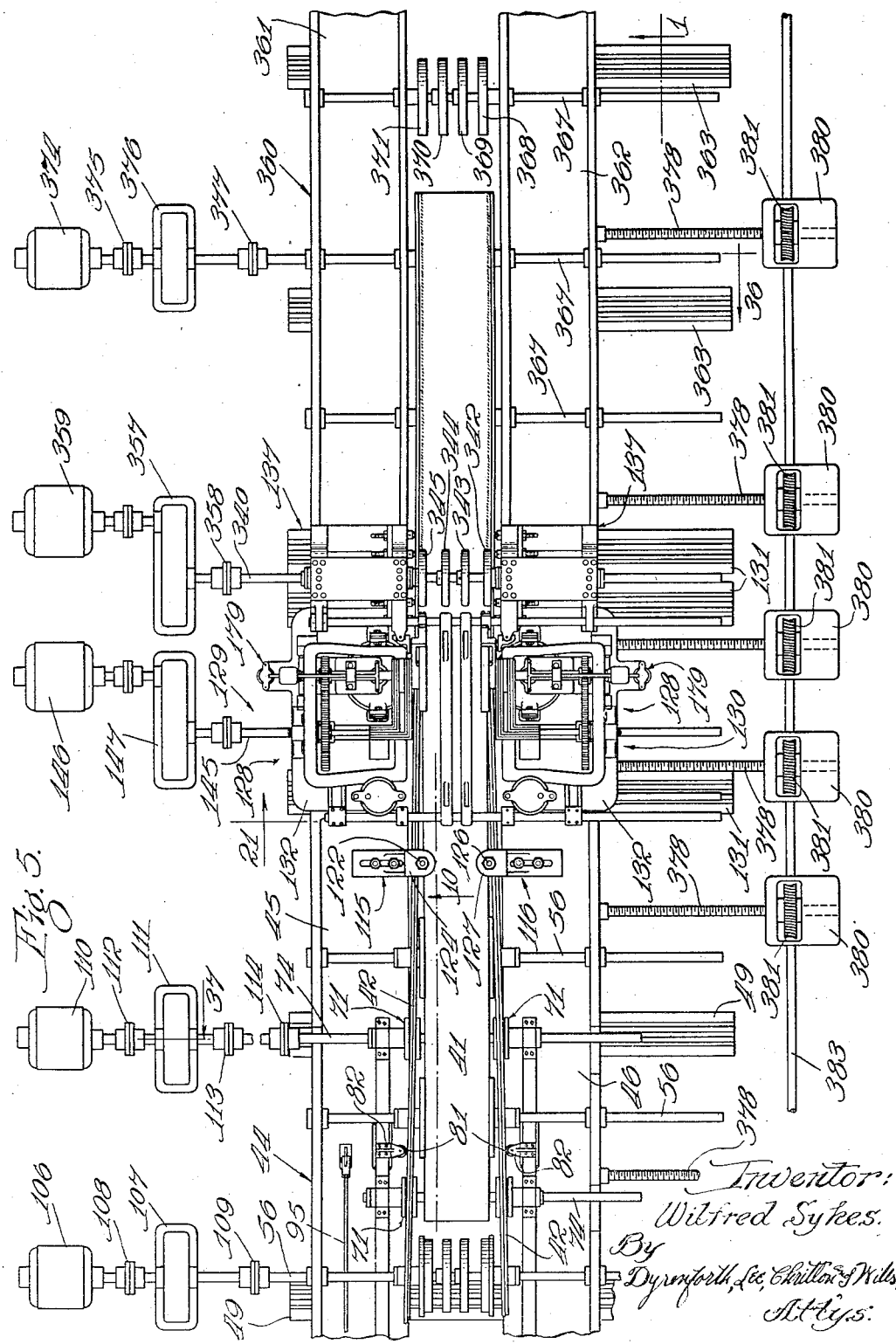

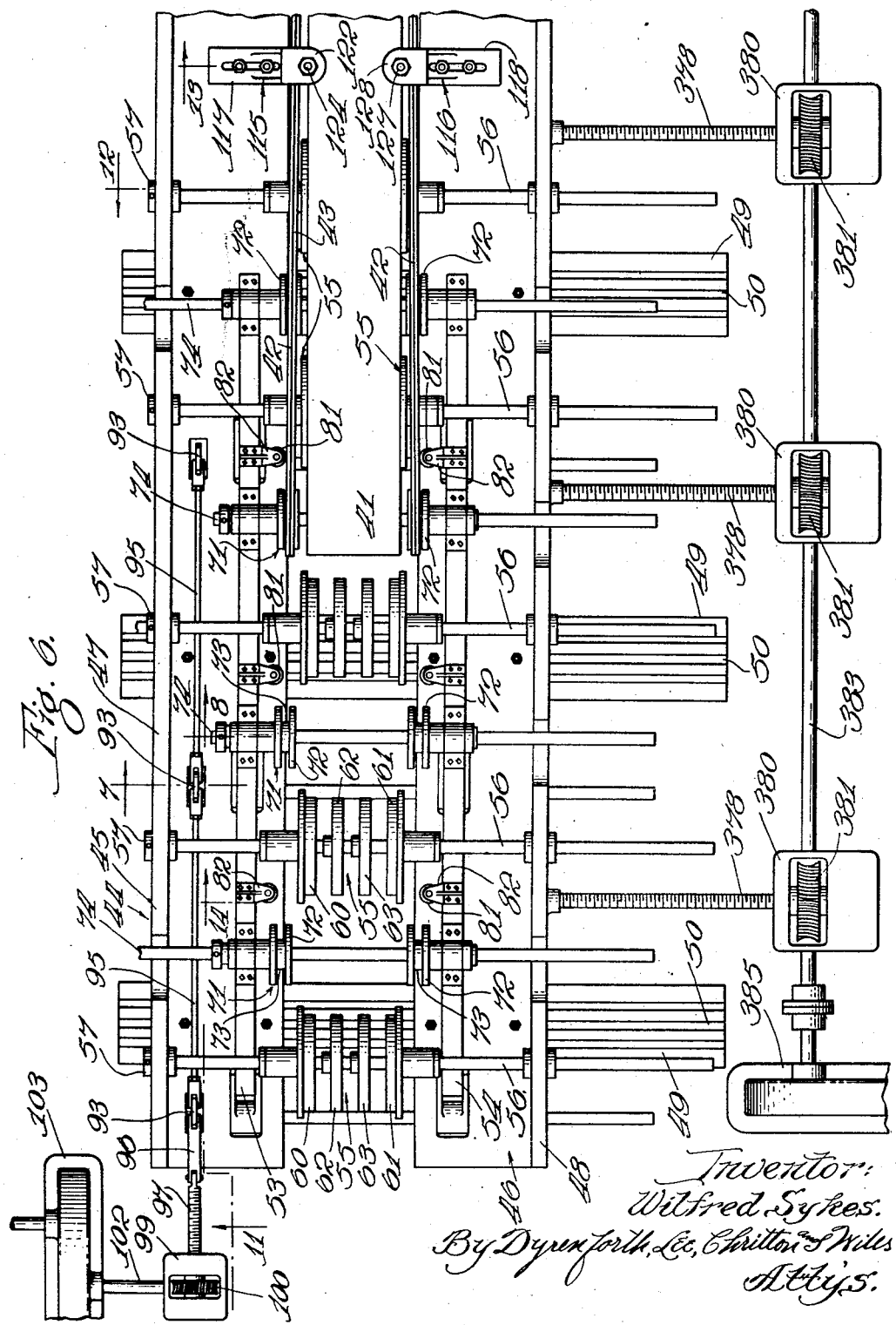

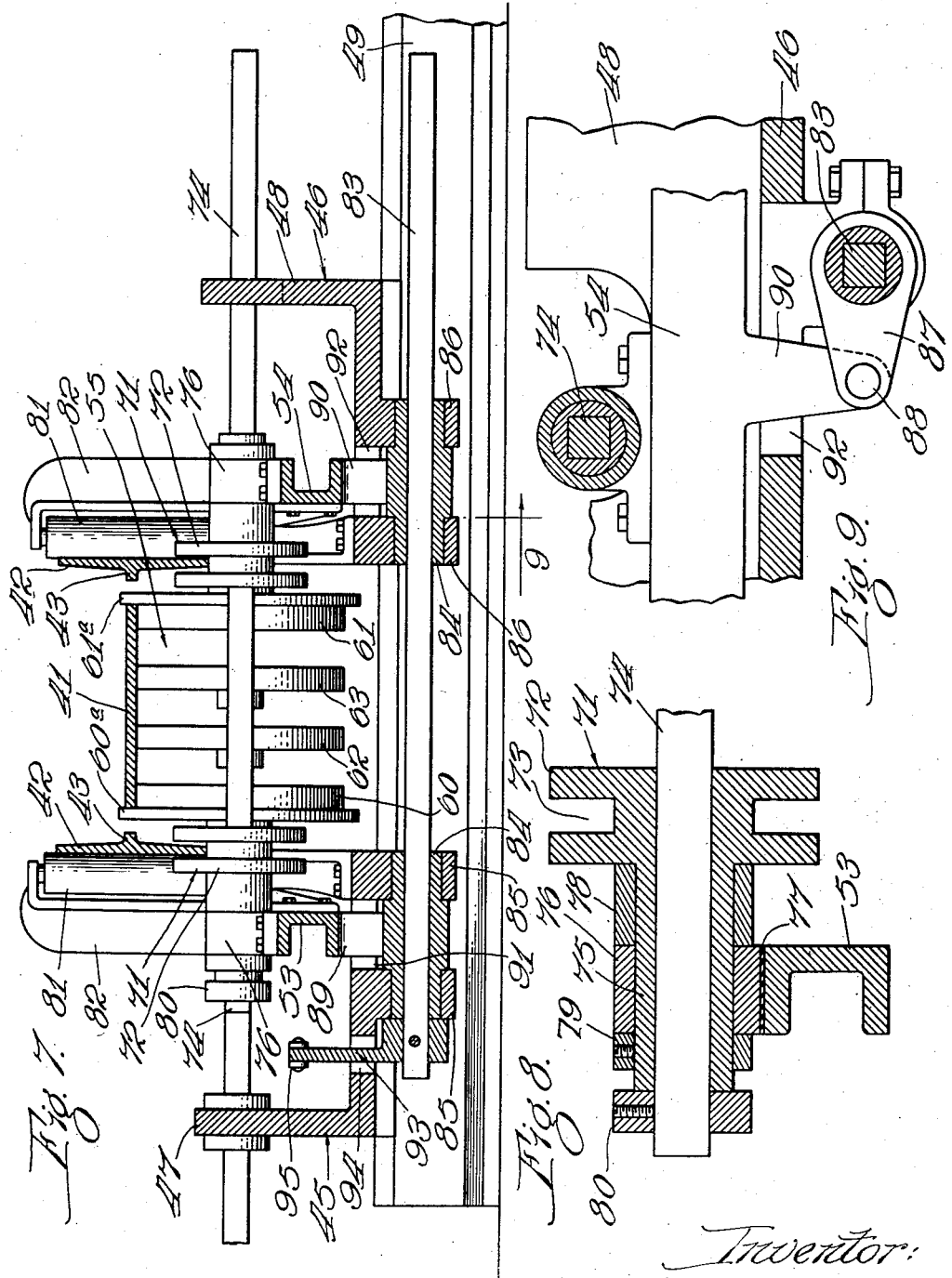

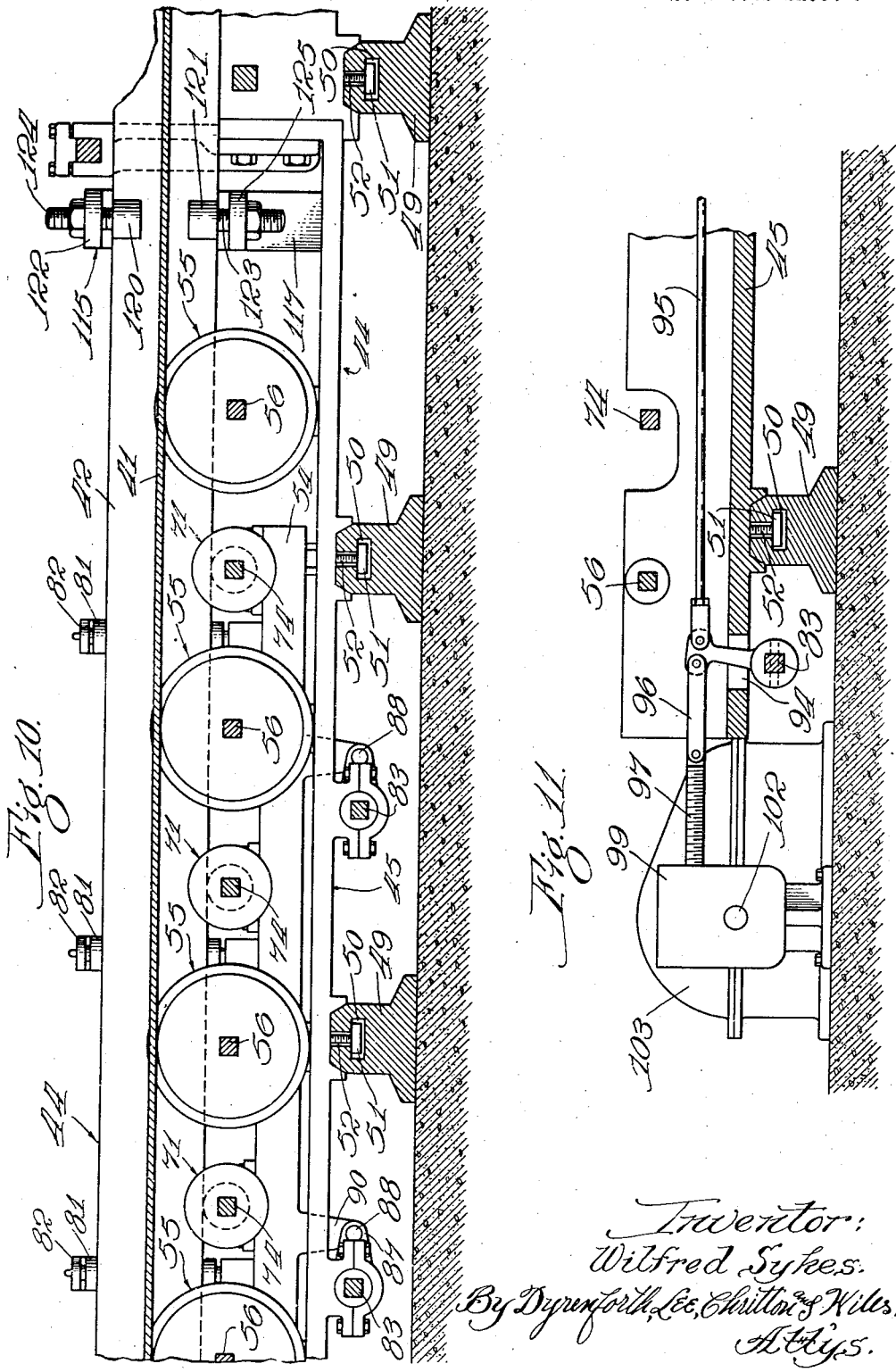

Nov. 14, 1939.          W. SYKES          2,179,802
APPARATUS FOR PRODUCING BEAMS, COLUMNS, OR THE LIKE
Filed Oct. 17, 1935          20 Sheets-Sheet 7
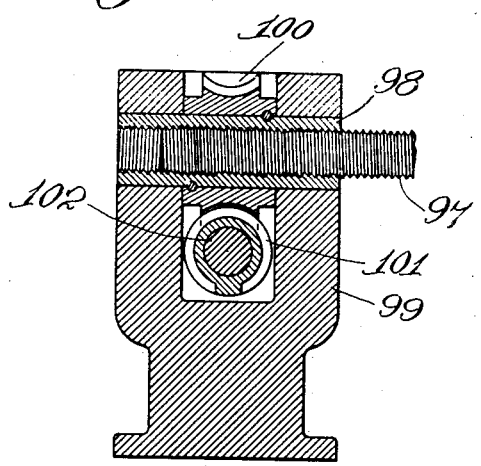
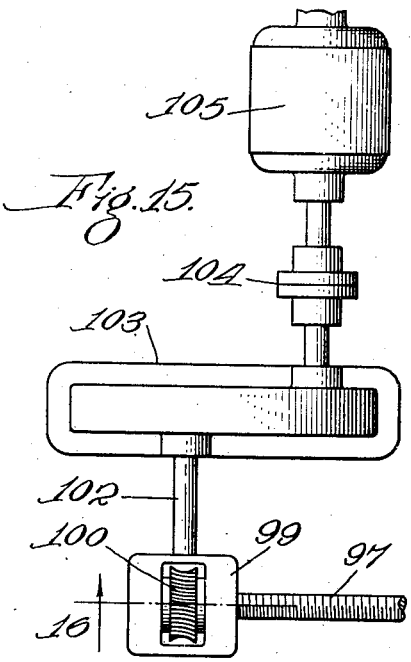
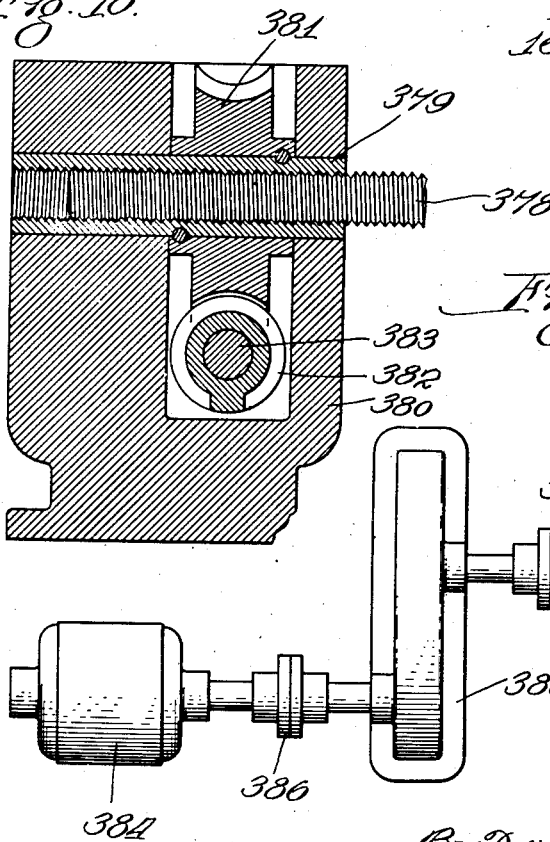
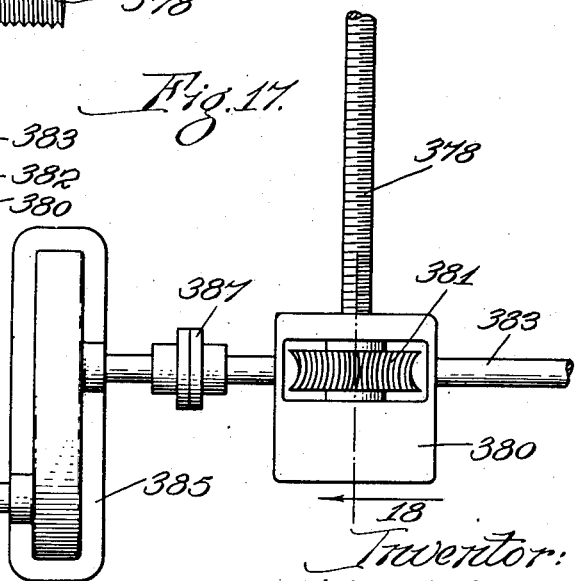
Inventor:
Wilfred Sykes.
By Dyrenforth, Lee, Chritton & Wiles.
Attys.

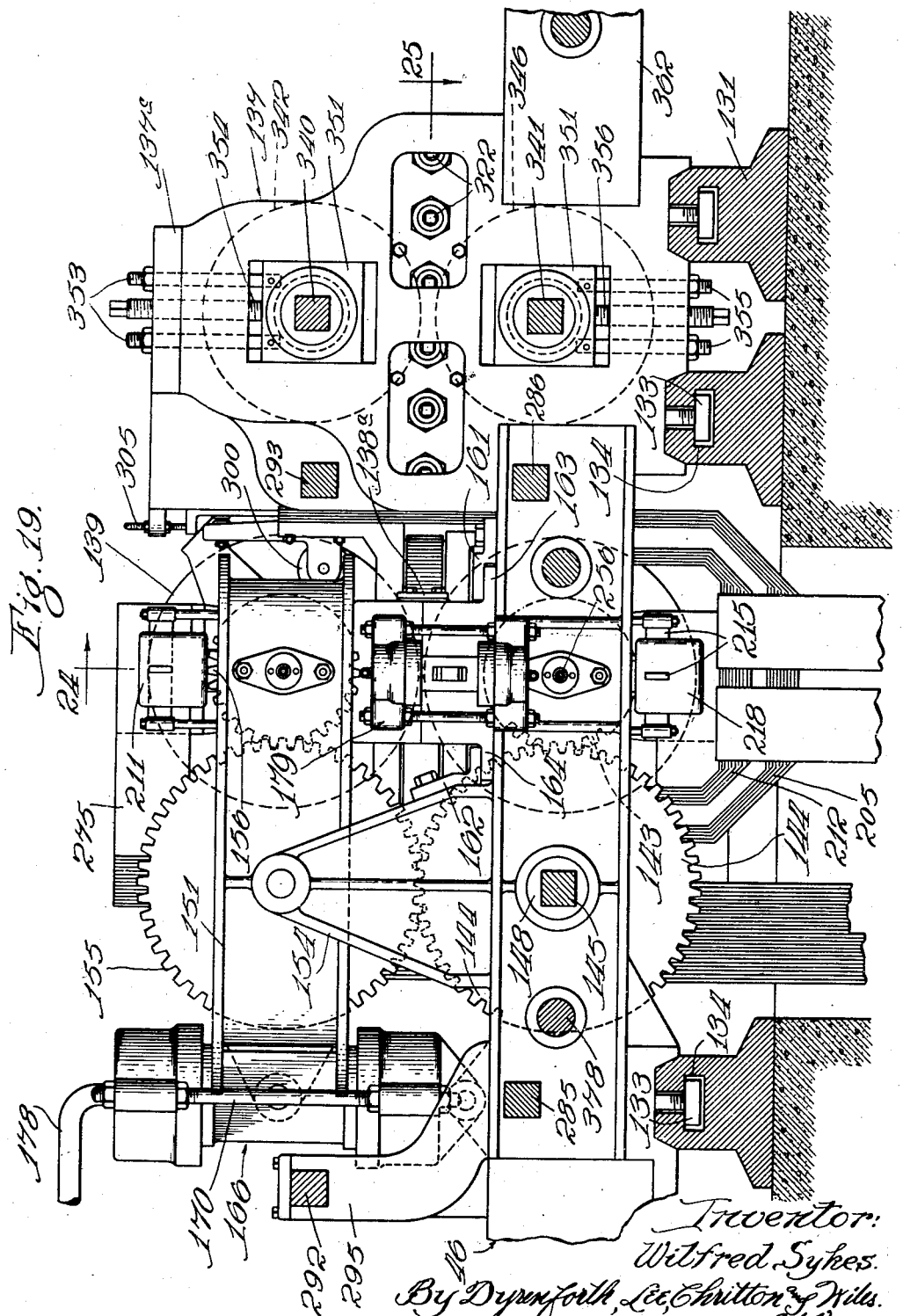

Nov. 14, 1939.  W. SYKES  2,179,802
APPARATUS FOR PRODUCING BEAMS, COLUMNS, OR THE LIKE
Filed Oct. 17, 1935  20 Sheets-Sheet 9

Inventor:
Wilfred Sykes.
By Dyrenforth, Lee, Chritton & Wiles
Attys.

Nov. 14, 1939.    W. SYKES    2,179,802
APPARATUS FOR PRODUCING BEAMS, COLUMNS, OR THE LIKE
Filed Oct. 17, 1935    20 Sheets-Sheet 10
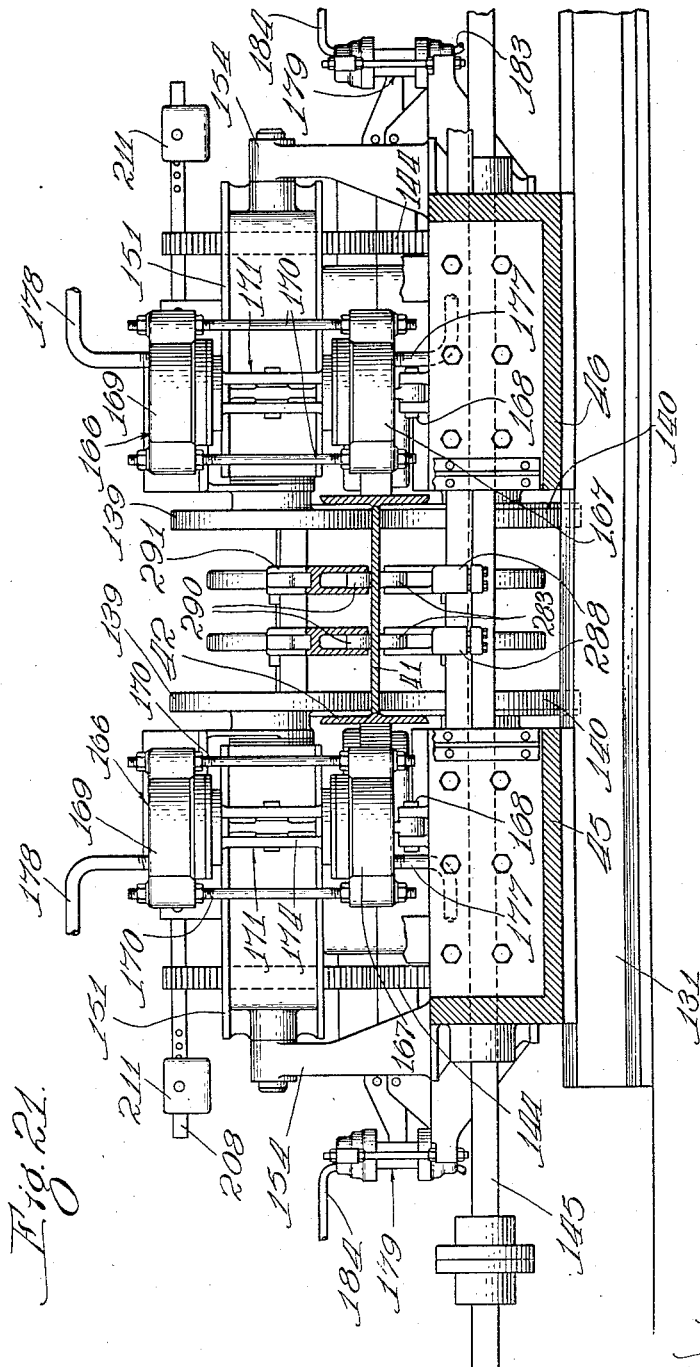
Inventor:
Wilfred Sykes.
By Dyrenforth, Lee, Chritton & Wiles
Attys.

Nov. 14, 1939.　　　　W. SYKES　　　　2,179,802
APPARATUS FOR PRODUCING BEAMS, COLUMNS, OR THE LIKE
Filed Oct. 17, 1935　　　20 Sheets-Sheet 11
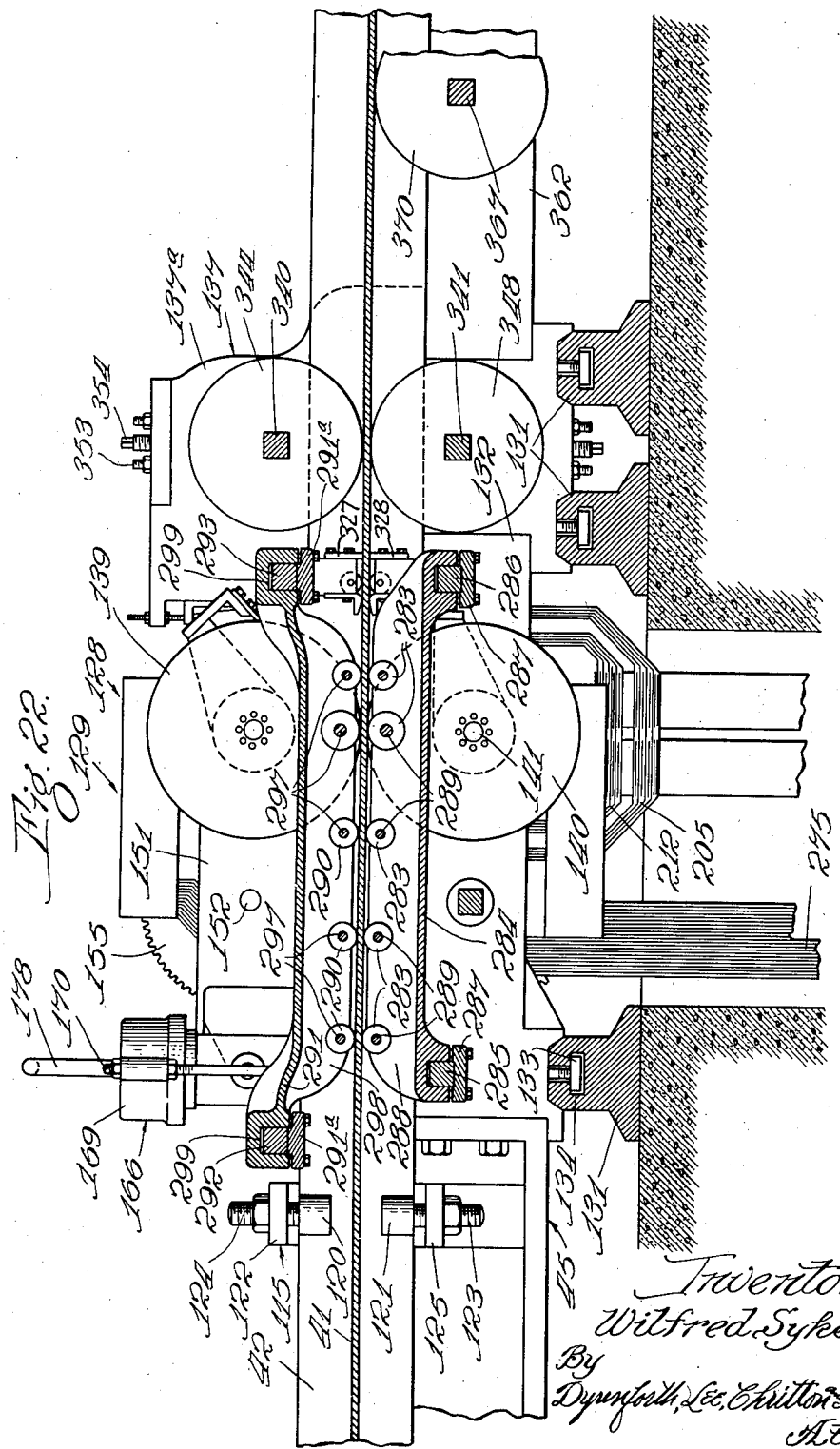

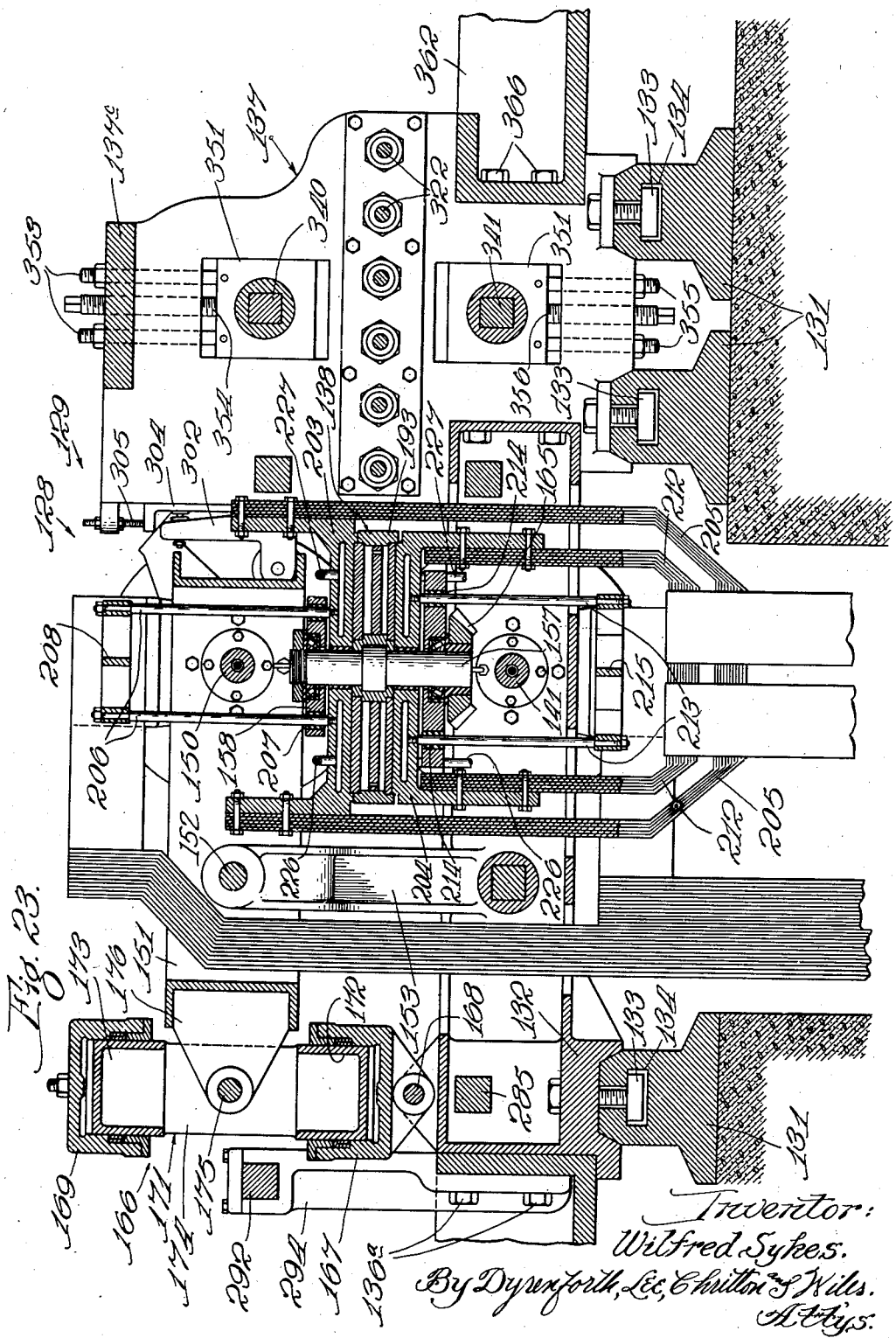

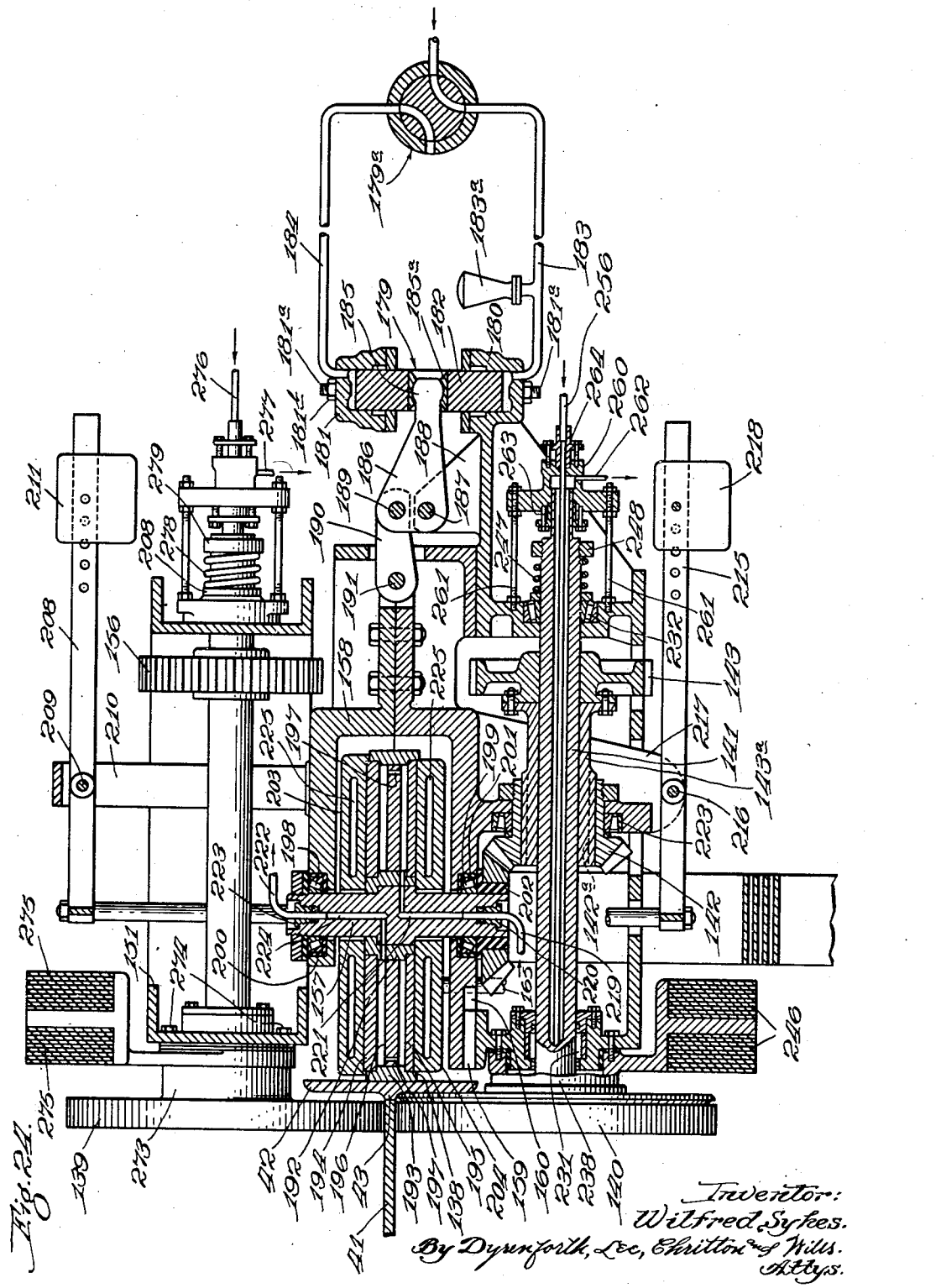

Nov. 14, 1939.  W. SYKES  2,179,802
APPARATUS FOR PRODUCING BEAMS, COLUMNS, OR THE LIKE
Filed Oct. 17, 1935  20 Sheets-Sheet 14
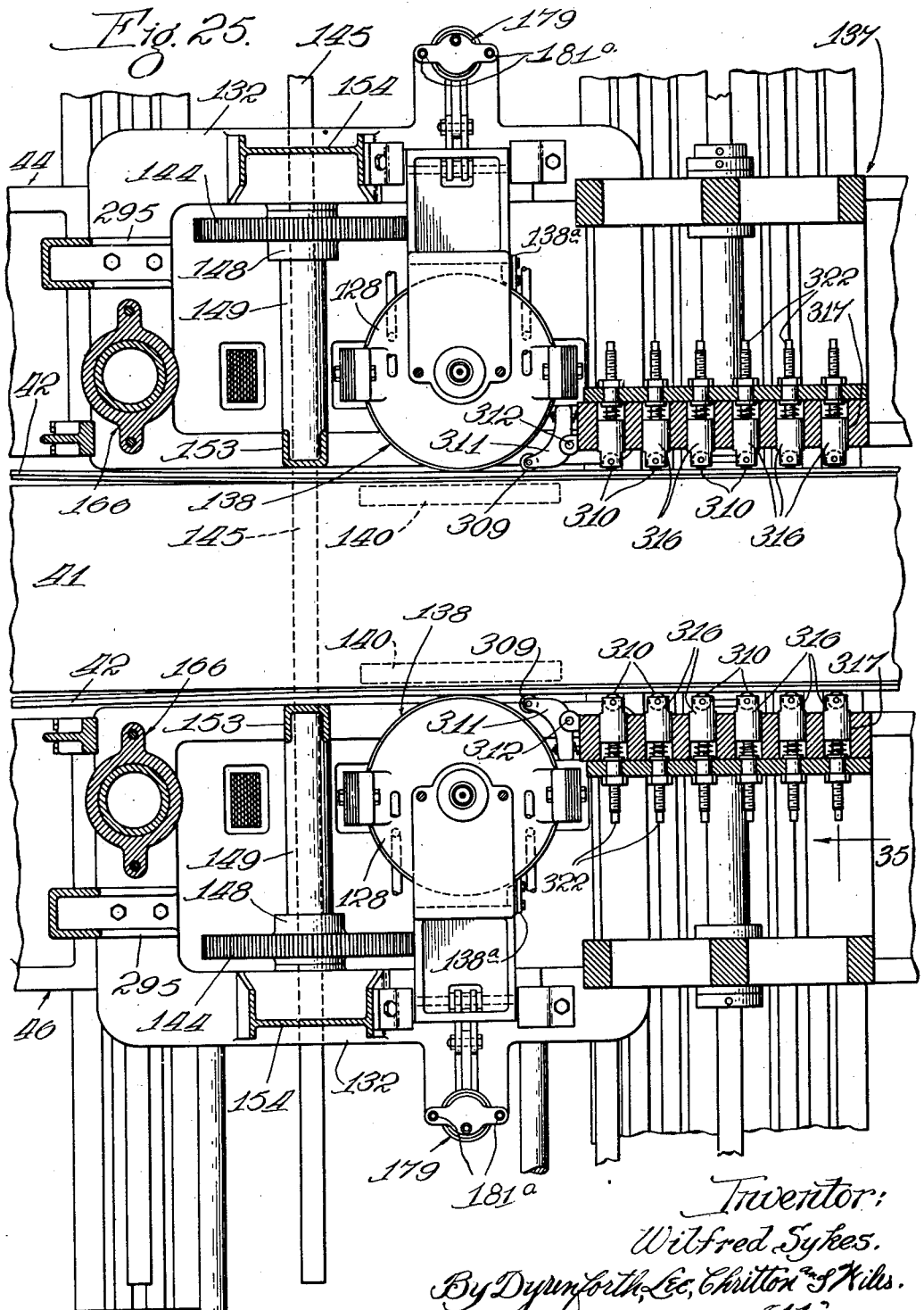

Nov. 14, 1939.    W. SYKES    2,179,802
APPARATUS FOR PRODUCING BEAMS, COLUMNS, OR THE LIKE
Filed Oct. 17, 1935    20 Sheets-Sheet 15
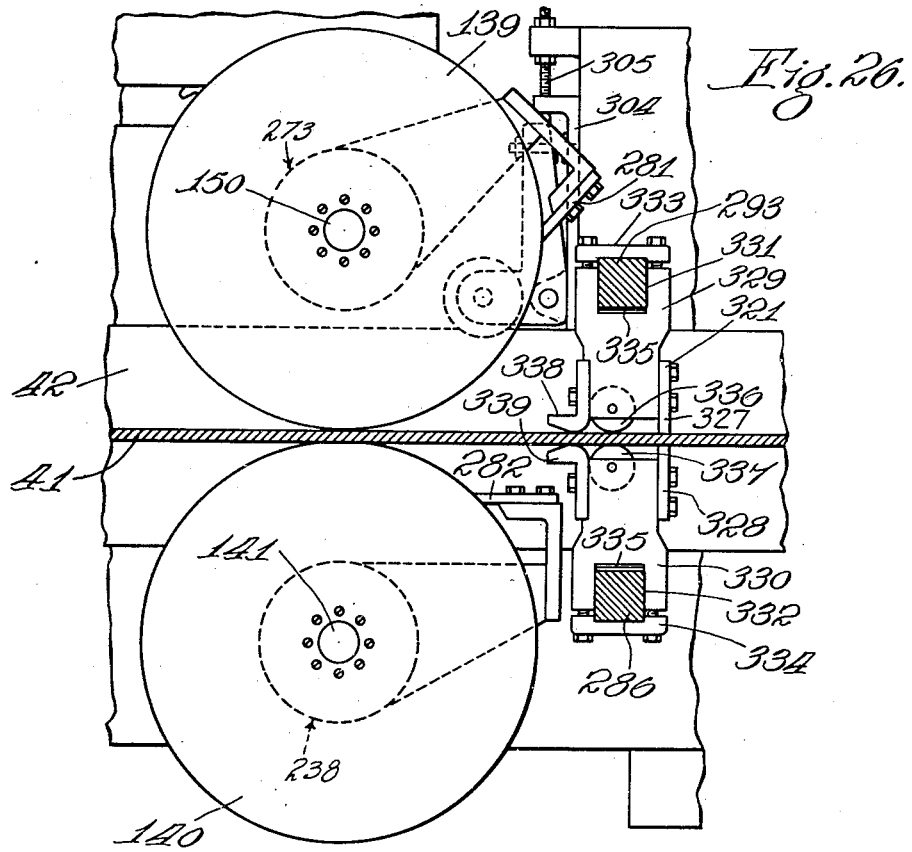
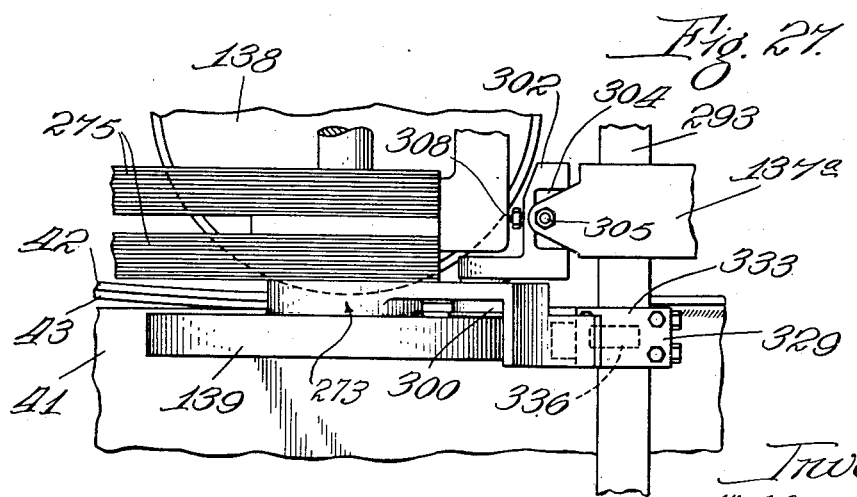
Inventor:
Wilfred Sykes.
By Dyrenforth, Lee, Chritton and Wiles.
Attys.

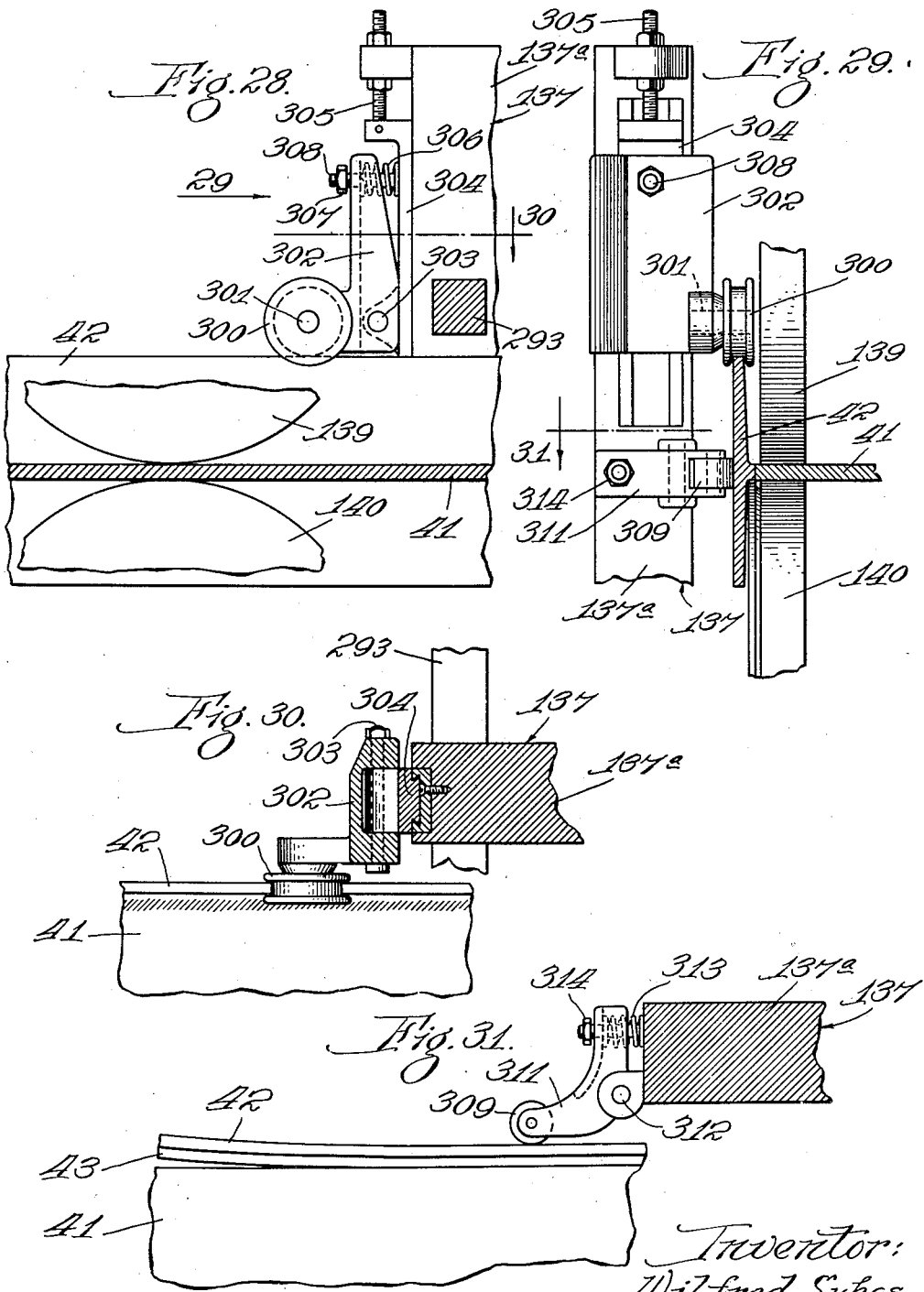

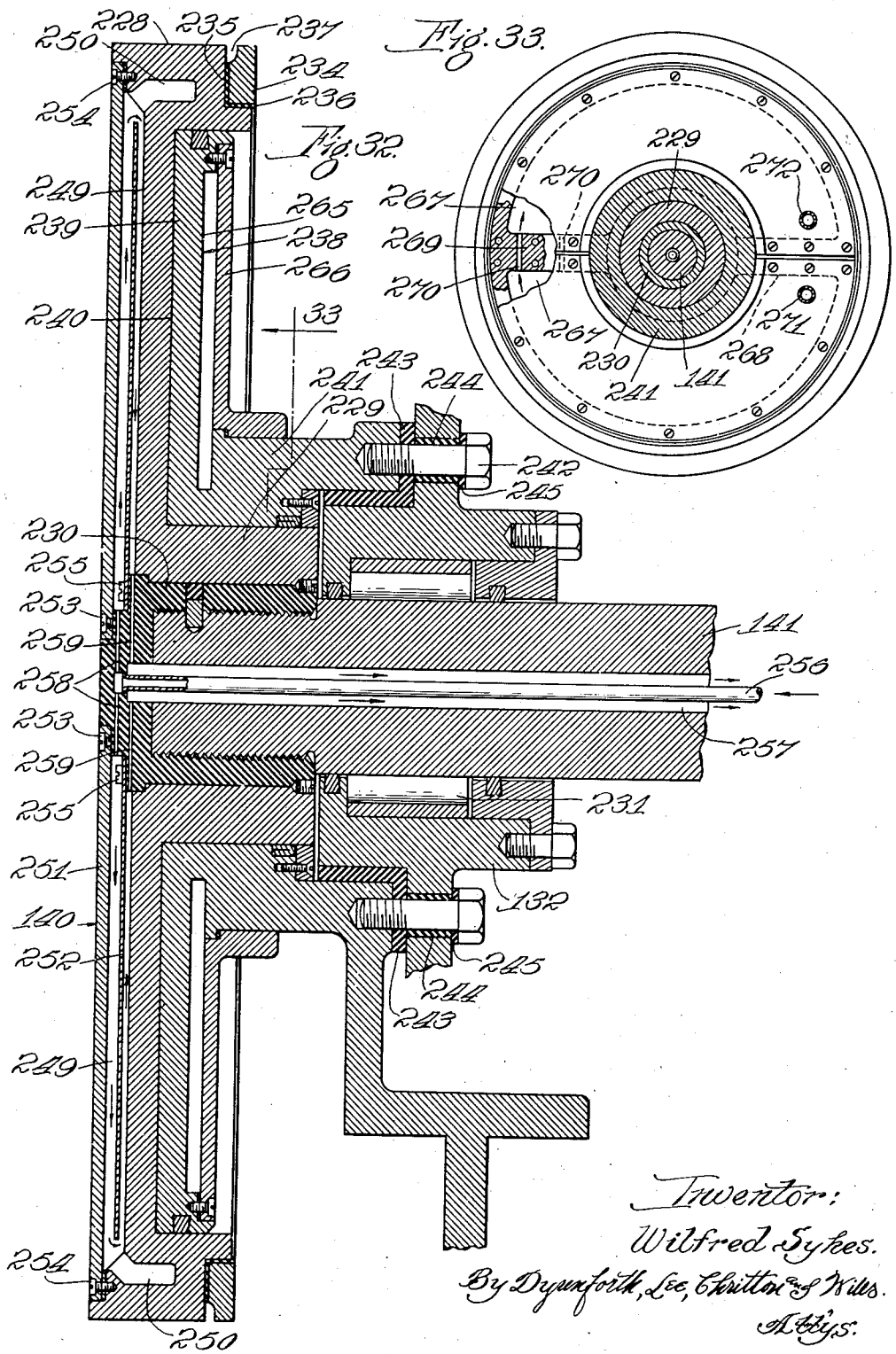

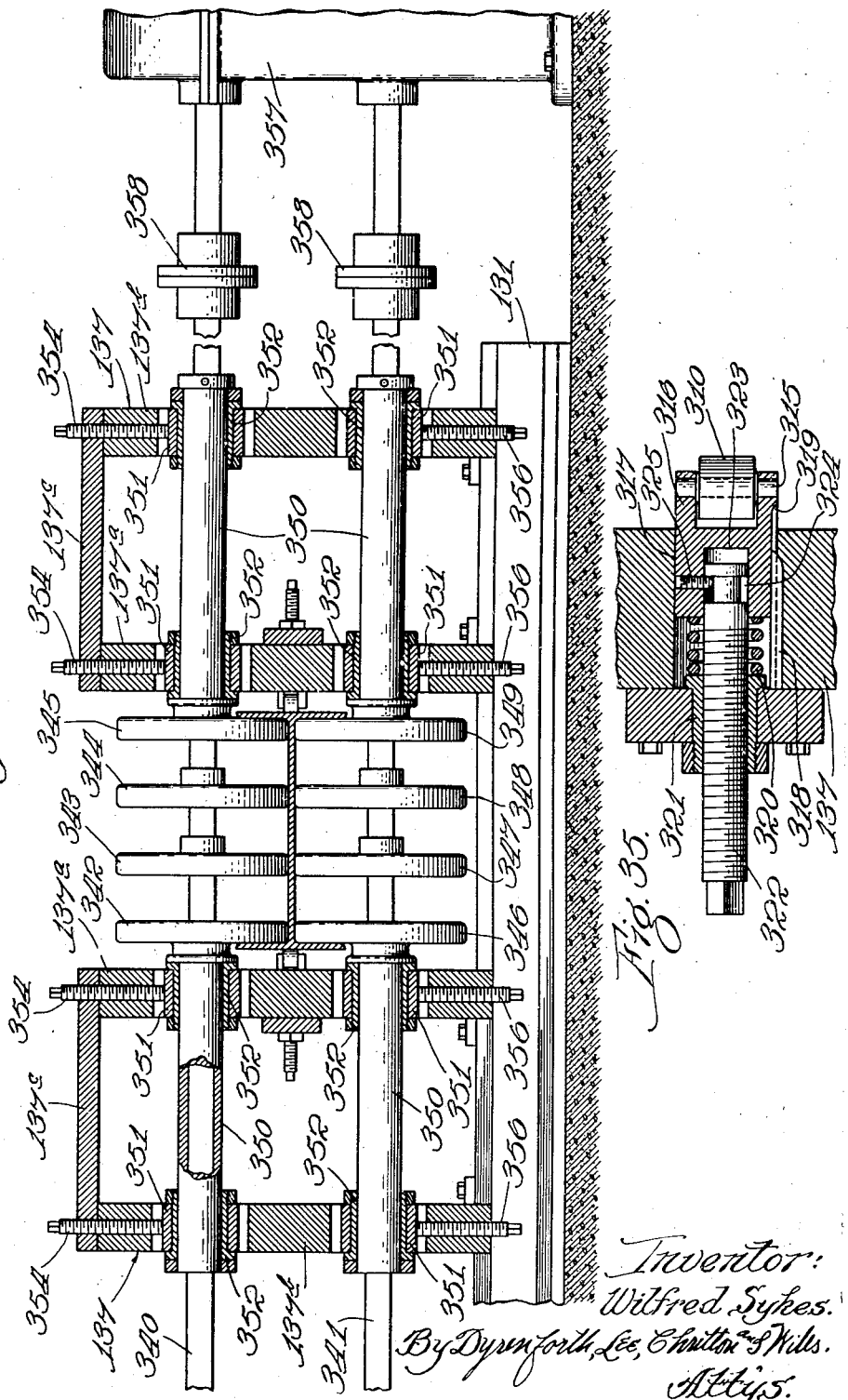

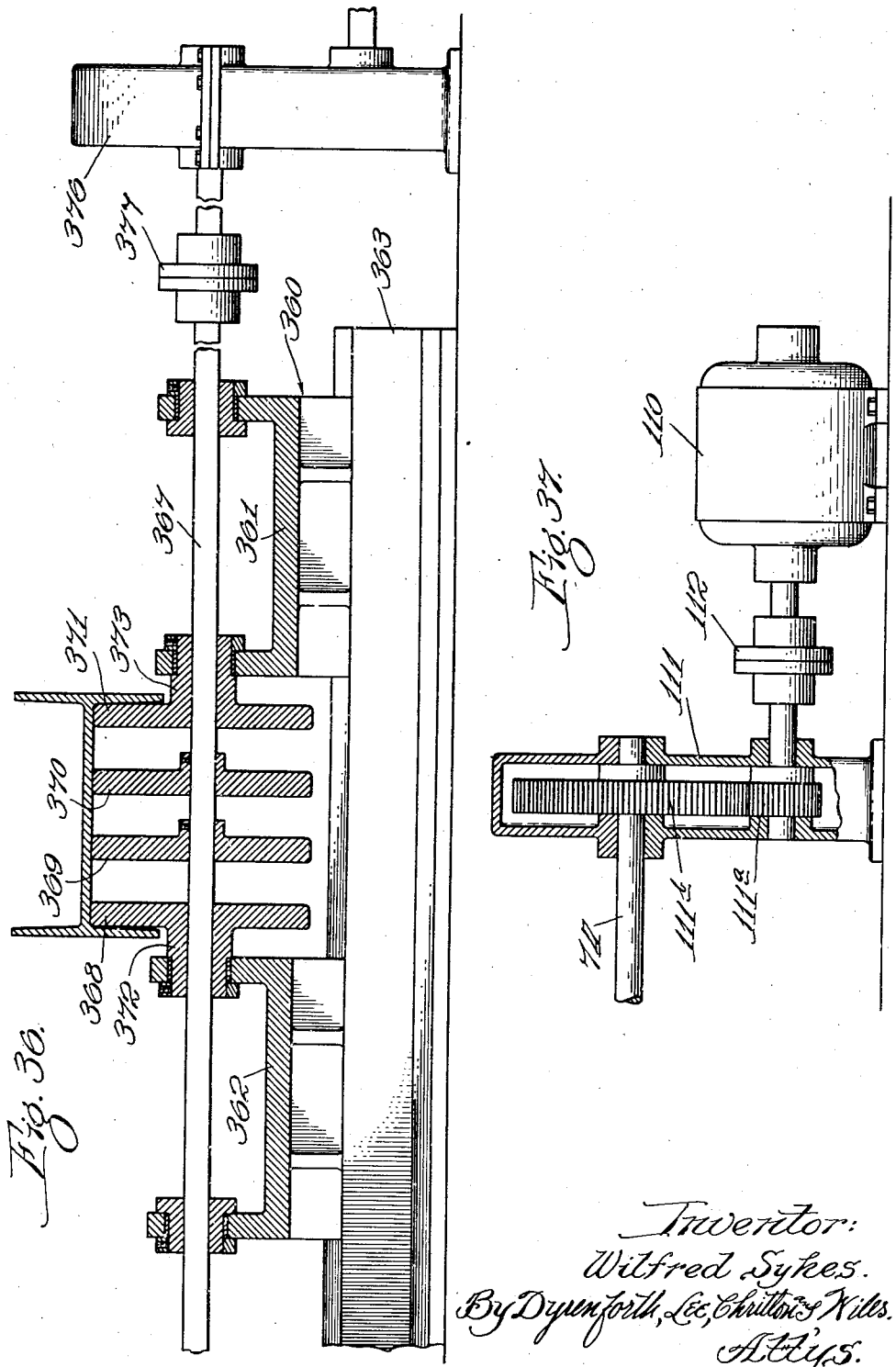

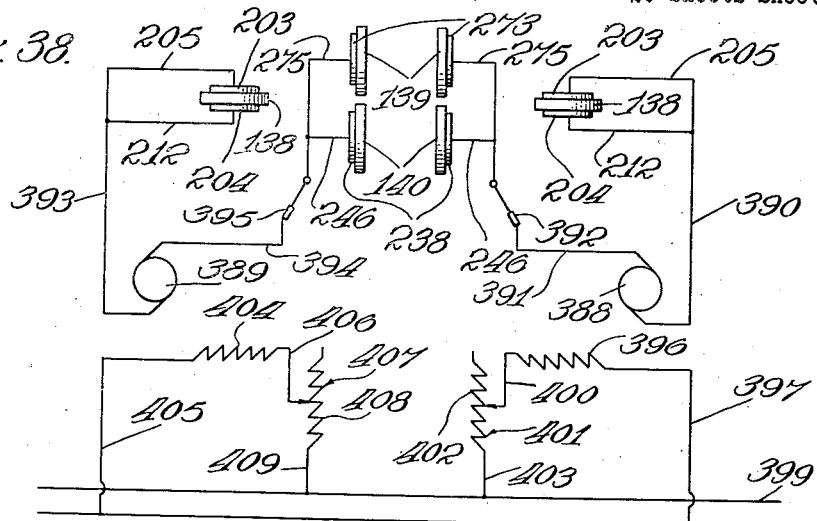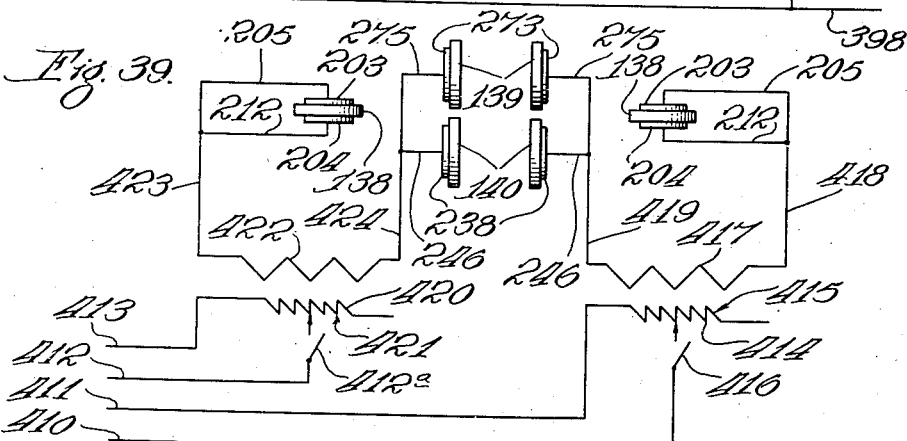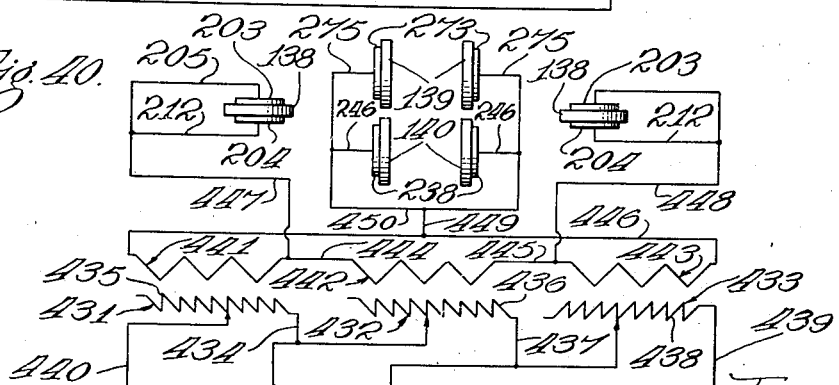

Patented Nov. 14, 1939

2,179,802

UNITED STATES PATENT OFFICE 2,179,802

APPARATUS FOR PRODUCING BEAMS, COLUMNS, OR THE LIKE

Wilfred Sykes, Chicago, Ill., assignor to Inland Steel Company, Chicago, Ill., a corporation of Delaware Application October 17, 1935, Serial No. 45,523

18 Claims. (Cl. 219—4)

My invention relates to the producing of built up metal structures as for example and more particularly beams and columns comprising web and flange members, the present application being in part, a continuation of my application for United States Letters Patent Serial No. 732,359, filed June 25, 1934.

One of my objects is to reduce the cost of producing articles of the general character above referred to.

Another object is to minimize the amount of metal required for the production of such structures, particularly beams and columns.

Another object is to provide for the manufacture of such an article from separately formed elements comprising the web and flange portions of the finished article whereby any desired combination of flange members and web members, within wide limits, may be produced.

Another object is to provide for the producing of such articles by welding together the separate elements of which they are formed.

Another object is to produce an article of the kind above referred to the flange and web portions of which are formed of separate elements of the desired shape and dimensions to form an integral structure; and other objects as will be manifest from the following description.

Referring to the accompanying drawings:

Figure 1 is a longitudinal sectional elevational view, taken at the line 1 on Fig. 5 and viewed in the direction of the arrow, of the welding portion and parts of the entering and delivery end portions, of the apparatus.

Figure 2 is a diagrammatic view in side elevation illustrating the relative positions of the work and certain of the rolls of the portions of the apparatus shown in Fig. 1.

Figure 3 is a cross sectional view of the beam or column structure produced on the apparatus and showing the condition thereof following the welding operation.

Figure 4 is a similar view of the beam produced by the apparatus.

Figure 5 is a plan view of the portions of the apparatus shown in Fig. 1.

Figure 6 is a plan view, with certain parts broken away, of the entering end portion of the apparatus.

Figure 7 is a broken enlarged sectional view taken at the line 7 on Fig. 6 and viewed in the direction of the arrow.

Figure 8 is an enlarged broken sectional view taken at the line 8 on Fig. 6 and viewed in the direction of the arrow.

Figure 9 is a broken sectional view taken at the line 9 on Fig. 7 and viewed in the direction of the arrow.

Figure 10 is an enlarged broken sectional view taken at the line 10 on Fig. 5 and viewed in the direction of the arrow.

Figure 11 is an enlarged broken sectional view taken at the line 11 on Fig. 6 and viewed in the direction of the arrow.

Figure 12 is an enlarged broken sectional view taken at the line 12 on Fig. 6 and viewed in the direction of the arrow.

Figure 13 is an enlarged broken sectional view taken at the line 13 on Fig. 6 and viewed in the direction of the arrow.

Figure 14 is an enlarged sectional view taken at the line 14 on Fig. 6 and viewed in the direction of the arrow.

Figure 15 is a plan view of the drive mechanism shown at the upper left-hand corner of Fig. 6, and also in Fig. 11, for controlling the elevation at which grooved rollers for supporting the flange portions of the work and vertical rollers for engaging the outer faces of the flanges, at the entering end of the machine, extend.

Figure 16 is an enlarged sectional view taken at the line 16 on Fig. 15 and viewed in the direction of the arrow.

Figure 17 is a plan view of the drive mechanism shown at the lower left-hand corner of Fig. 6 by means of which the apparatus is rendered adjustable for the production of beams of different depths.

Figure 18 is an enlarged sectional view taken at the line 18 on Fig. 17 and viewed in the direction of the arrow.

Figure 19 is a view like Fig. 1, but enlarged, showing the welding portion of the apparatus.

Figure 21 is an enlarged sectional view taken at the line 21 on Fig. 5 and viewed in the direction of the arrow.

Figure 22 is a broken view, in sectional elevation, of the portion of the apparatus shown in Fig. 20, the section being taken at the line 22 on Fig. 20 and viewed in the direction of the arrow.

Figure 23 is a broken view in sectional elevation taken at the line 23—23 on Fig. 20 and viewed in the direction of the arrows.

Figure 24 is a view in vertical sectional elevation of the section of the welding mechanism at one side of the machine, the section being taken at the line 24 on Fig. 19 and viewed in the direction of the arrow.

Figure 25 is a broken plan sectional view taken at the line 25 on Fig. 19 and viewed in the direction of the arrow.

Figure 26 is a broken enlarged view in sectional elevation showing certain of the electrode rolls, cleaning means therefor, and means for removing the beads formed at the junctures of the web and flange portions of the work in the welding operation, the section being taken at the line 26 on Fig. 20 and viewed in the direction of the arrow.

Figure 27 is a broken plan view of the structure shown in Fig. 26.

Figure 28 is a broken enlarged view in vertical sectional elevation, the section being taken at the line 28 on Fig. 20 and viewed in the direction of the arrow.

Figure 29 is a broken view in elevation of the structure shown in Fig. 28, the view being taken in the direction of the arrow 29 in this figure and illustrating the work in section.

Figure 30 is a broken plan sectional view taken at the line 30 on Fig. 28 and viewed in the direction of the arrow.

Figure 31 is a broken plan sectional view taken at the line 31 on Fig. 29 and viewed in the direction of the arrow, the work being shown in plan.

Figure 32 is an enlarged broken view in vertical sectional elevation of one of the lower welding electrode rolls and its mounting, the section being taken at the line 32 on Fig. 20 and viewed in the direction of the arrow.

Figure 33 is a sectional view, reduced in size, of the structure shown in Fig. 32 the section being taken at the irregular line 33 on Fig. 32 and viewed in the direction of the arrow, a portion of the structure shown in elevation being partly broken away.

Figure 34 is a view in vertical sectional elevation, the section being taken at the line 34 on Fig. 20 and viewed in the direction of the arrow, this view showing certain of the work-feeding rollers of the delivery portion of the machine adjacent the welding mechanism.

Figure 35 is a broken enlarged sectional view of a detail of one of a number of similar vertical rolls engaging the outer faces of the flange portions of the work after the welding operation has been effected, the section being taken at the line 35 on Fig. 25 and viewed in the direction of the arrow.

Figure 36 is an enlarged sectional elevational view of one of the similar work-supporting roller mechanisms at the delivery portion of the machine, the section being taken at the line 36 on Fig. 5 and viewed in the direction of the arrow.

Figure 20:
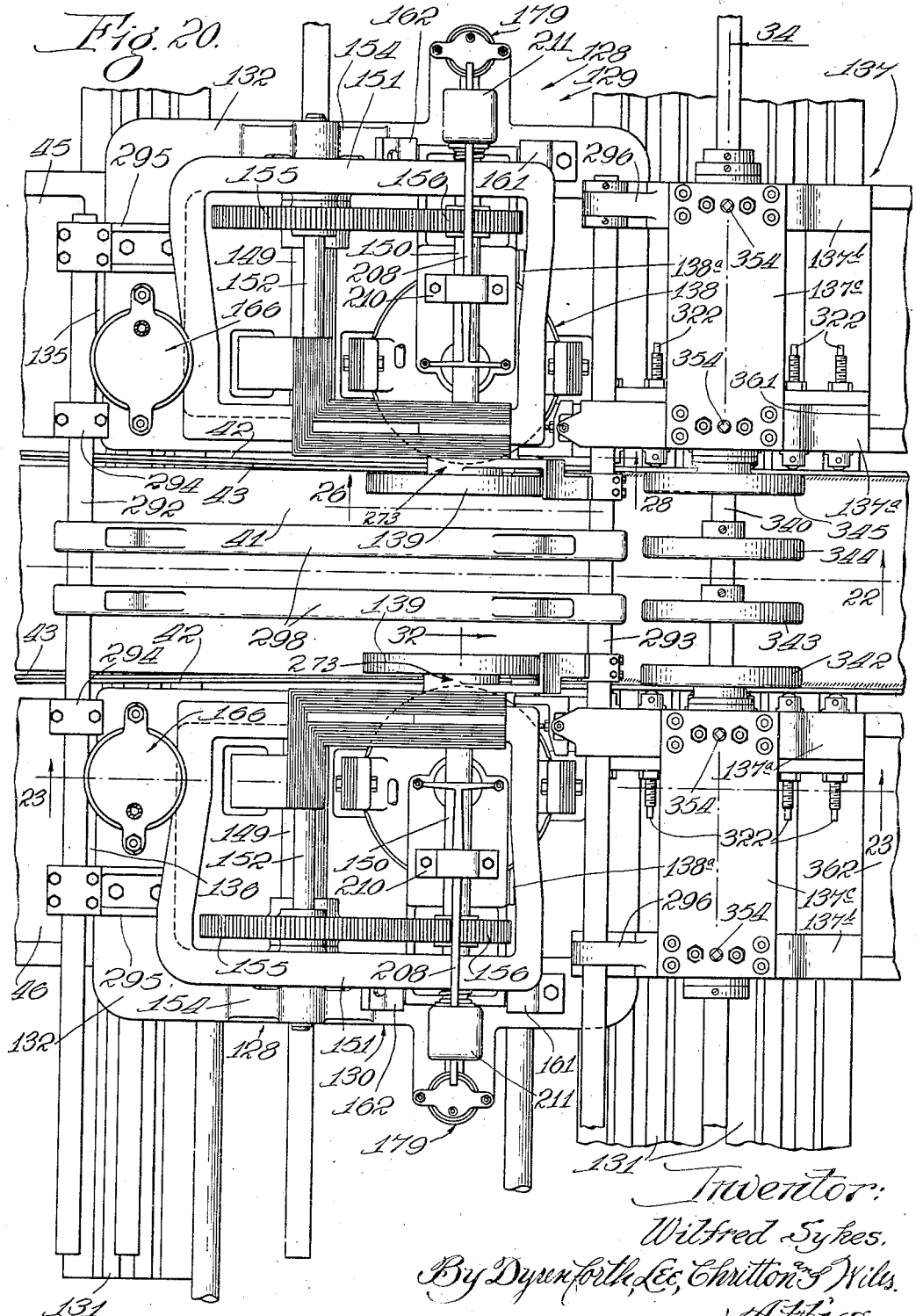
Figure 20 is a plan view of the portion of the apparatus shown in Fig. 19.

Figure 37 is an enlarged sectional elevational view of driving means for the web-engaging rollers of the apparatus, the section being taken at the line 37 on Fig. 5 and viewed in the direction of the arrow; and Figures 38, 39 and 40, diagrammatic views of different circuit arrangements for supplying the welding current to the apparatus; the circuit arrangement of Fig. 38 involving the use of direct current in which a separate generator is provided for each flange electrode roll and the adjacent web electrode rolls; and the circuit arrangements shown in Figs. 39 and 40 involving the use of alternating current, the circuit arrangement of Fig. 39 employing a two-phase circuit, and that shown in Fig. 40 a three-phase circuit.

As a preface to the following description of the illustrated apparatus, it may be stated that the particular apparatus shown is provided for the manufacture of beams or columns of general I-shape in cross section (though the invention is not limited thereto) formed of a separate web-forming section represented at 41 and flange-forming sections represented at 42 in Figs. 1–3, 5–7, 10, 13, 14, 20–22, 24–28, and 31; each flange-forming section 42 being shown as provided along a face thereof with a rib 43 extending the full length of the section and equidistantly spaced from the longitudinal edges thereof and at which ribs the flange-forming sections 42 are welded to the opposite longitudinal edges of the web-forming section 41, each rib 43 preferably being of a thickness substantially equal to the thickness of the web-forming section 41 and of a height not less than its thickness.

The particular apparatus shown and designed to effect the welding by a continuous operation, comprises at the entering end thereof a table represented generally at 44, on which the web-forming sections 41 and the flange-forming sections 42 are assembled preliminary to the feeding thereof through the apparatus.

The table 44 is shown as comprising parallel beams 45 and 46 located at opposite sides of the apparatus and extending longitudinally thereof and having upstanding flanges 47 and 48, respectively, at their outer edges. The beams 45 and 46 are supported on transverse beams 49 forming a foundation and containing longitudinal, undercut, upwardly facing, ways 50 into which the nuts 51 of bolts 52 depending from the beams 45 and 46, extend, it being intended that the beam 46, in the particular construction shown, be adjustable toward and away from the beam 45 to adapt the apparatus for the manufacture of beams the web portions of which are of different widths.

The table 44 also comprises parallel bars 53 and 54, extending lengthwise, and within the confines, of the respective beams 45 and 46 and supported as hereinafter described for vertical adjustment relative to the beams 45 and 46.

The table 44 further comprises horizontal roller mechanisms for supporting, respectively, the web-forming section 41 and the flange-forming sections 42.

The web-supporting roller mechanisms referred to and represented generally at 55 and arranged in a horizontal series disposed lengthwise of the table 44, comprise square shafts 56 extending crosswise of the apparatus each of these shafts being provided with a double flanged sleeve 57 rigidly connected therewith as by a set screw 58, at which the shaft is journalled in the flange 47 of the beam 45. The shafts 56 extend through the flange 48 of the beam 46 in which they are journalled at double flanged sleeves 59 rotatable with the shafts 56 but slidable therealong.

Mounted on each shaft 56 for rotation therewith and located between the flanges 47 and 48, is a series of separate rollers, the end ones of which represented at 60 and 61, are flanged at 60ª and 61ª, and the intermediate ones of each are represented at 62 and 63, the number of which latter may be varied as conditions may require. The end rollers 60 and 61 are shown as provided with sleeve-extensions 64 and 65, respectively, (Fig. 12) which are journalled in bearings 66 and 67 rising from the beams 45 and 46, respectively, the outer ends of the sleeves 64 and 65 being provided with collars 68 and 69, respectively, to prevent relative longitudinal movement between the rollers 60 and 61 and the bearings 66 and 67, respectively, the intermediate rollers 62 and 63 being slidable on the shaft and held in adjusted position thereon by set screws 70; it being understood that the rollers 61 slide along the shaft 56 carrying them in the adjusting of the beam 46 relative to the beam 45.

The flange-supporting roller mechanisms above-referred-to and represented at 71 and arranged in a horizontal series disposed lengthwise of the table 44 comprise rollers 72 the peripheries of which are annularly grooved as represented at 73 (Figs. 7 and 8), these rollers being mounted in pairs on square shafts 74 alternating with the shafts 56 and journalled at sleeve-extensions 75 on the rollers 72, in boxes 76 secured to the bars 53 and 54 with electrical insulation 77 therebetween. The rollers 72 are spaced from the boxes 76 by sleeves 78 surrounding the sleeves 75, collars 79 provided on the outer ends of the sleeve-extensions 75 holding the rollers 72 against lengthwise displacement in the boxes 76. The roller mountings just described at the bar 54 are slidable along the shafts 74 in the lateral adjustment of the beam 46 and to insure against lengthwise displacement of the shafts 74 in the adjustment of the beam 46 these shafts are provided with collars 80 secured thereto and abutting the outer ends of those of the sleeve-extensions 75 which are provided at the bar 53.

The pairs of rollers 72 are progressively more closely spaced toward the delivery end of the apparatus as shown in the drawings and thus the flange-forming sections 42 which rest at their lower edges in the grooves 73 in these rollers extend divergingly in the rollers 72 and in spaced relation to the opposite longitudinal edges of the web-forming sections 41 which would be introduced into the apparatus to flatwise rest, and be supported, on the web-supporting rollers 60—63 as shown.

The rollers 72 being supported on the vertically adjustable bars 53 and 54, and the bar 54, together with the adjacent ones of the rollers 72, being adjustable laterally with the beam 46, the table 44 is thus adapted for the assembling thereon of web-forming sections 41 and flange-forming sections 42 of greatly different widths, into the desired positions relative to each other.

Located at intervals along the series of roller mechanisms 55 and 71 are vertical rollers 81 (Figs. 7 and 14) journalled at their ends in yokes 82 secured to the bars 53 and 54 with insulation interposed therebetween as represented at 53ª in Fig. 14, these rollers, arranged in pairs as shown, being positioned to engage the outer faces of the flange forming sections 42.

The bars 53 and 54 are shown as supported for vertical adjustment to simultaneously vertically adjust the rollers 72 and 81, by mechanism comprising square rock shafts 83 journalled at shouldered bushings 84 thereon (Fig. 7) in depending pairs of lugs 85 and 86 on the beams 45 and 46, respectively, the shafts 83 having pairs of arms, one of which is represented at 87 (Fig. 8), rigid thereon and pivoted at their bifurcated outer ends, as indicated at 88, to pairs of depending lugs 89 and 90 (Fig. 9) on the bars 53 and 54, respectively, and extending through slots 91 and 92 in the beams 45 and 46.

Each shaft 83 carries an arm 93 (Figs. 6, 7 and 11) extending upwardly through a slot 94 in the beam 45, adjacent ones of the arms 93 being pivotally connected together by links 95 and the arm of one of the series 93 thereof pivotally connected by a link 96 with a screw shaft 97 having screw threaded engagement with a tubular nut 98 (Figs. 15 and 16) journalled in a housing 99 and carrying a worm wheel 100 rigid therewith, the worm wheel 100 meshing with a worm 101 rigid on a shaft 102 of a speed-reducer mechanism 103 of any desirable construction, the latter, in turn, being connected, by a flexible coupling 104, with a source of driving power, as for example a reversible electric motor as shown at 105.

The feed of the work along the table 44 is effected by positively driving certain of the mechanisms 55 and 71; in the particular construction shown, but which may be varied as desired, one only of the roller mechanisms 55, namely, the central one, and two only of the roller mechanisms 71, namely, the end ones thereof, being positively driven.

The drive for the central mechanism 55 comprises a power device 106 (Fig. 5), such as an electric motor, connected with the shaft 56 of this roller mechanism through a speed reducer mechanism 107 and interposed flexible couplings 108 and 109.

The drives for the end ones of the roller mechanisms 71 and of similar construction, comprise power devices, such as for example electric motors and speed reducers coupled to the motors by flexible couplings and to the shafts 74 of these roller mechanisms by double flexible couplings, the motor for the driven shaft 74 shown in Fig. 5 being represented at 110 (Fig. 37), the speed reducer at 111 and comprising a small drive-gear 111ª and a larger driven-gear 111ᵇ, the flexible coupling connecting the motor and speed reducer at 112, and the double flexible coupling connecting the speed reducer and the shaft 74 at 113 and 114.

Additional guide means (Figs. 5, 6, 13) for the flange-forming sections 42 are provided, these means being in the form of roller mechanisms 115 and 116 located at opposite sides of the path travelled by the work and between the roller mechanisms 55 and 71 and the welding mechanism of the apparatus hereafter described.

The mechanisms 115 and 116, of similar construction, comprise brackets 117 and 118, rising from the bars 45 and 46, respectvely, with which they are connected by bolts for adjustment crosswise of these bars, with insulation interposed therebetween as shown at 119 of the bracket 117 (Fig. 13), and upper and lower vertical rolls, tapered to conformably fit the inner inclined surfaces of the flange-forming sections 42, and provided on the adjacent ends of vertical screw studs threaded in upper and lower spaced apart flanges on the uprights; the rolls of the mechanism 115 being shown at 120 and 121, the threaded studs at 122 and 123 and the upper and lower flanges at 124 and 125 and the upper stud and upper flange of mechanism 116 at 126 and 127, respectively, it being understood that the mechanisms 115 and 116 are adapted for vertical adjustment with the roller mechanisms 71 and the rollers 81 inasmuch as they are carried by the bars 53 and 54, and that the mechanism 116 is laterally adjustable with the beam 46, the purpose of the crosswise adjustment of the mechanisms 115 and 116 being to insure such spreading of the flange-forming sections 42, that the initial contact between the sections 41 and 42 will occur substantially coincident with the point at which the welding pressure is applied, as hereinafter described.

Located adjacent to, and beyond, the roller mechanism 115 and 116 at the delivery end of the table 44 is the welding mechanism hereinbefore referred to and represented generally at 128 and operating to weld the flange-forming sections 42 at their ribs 43 to the opposite longitudinal edges of the web-forming section 41 in the travel of these parts through the apparatus.

The welding mechanism is shown as comprising two main sections 129 and 130 of the same construction, but provided as rights and lefts, located at opposite sides of the apparatus and supported on transverse beams 131 as in the case of the beams 45 and 46 and engaging at bolts 133 thereon, undercut ways 134 in the beams 131, it being intended that the section 130 be adjustable on the beams 131 toward and away from the section 129 to adapt the welding mechanism to operate on work of different sizes.

The sections 129 and 130 comprise electrode-carrying open-top frame-like members 132 rigidly connected, as with bolts, with flanges 135 and 136 provided on the ends of the beams 45 and 46, respectively, (the bolts which connect the flange 136 with the adjacent frame 132 being represented at 136ª) and stands 137 with which the members 132 are rigidly connected, each stand comprising inner and outer spaced apart uprights 137ª and 137ᵇ and a cross member 137ᶜ connected therewith.

Each section 129 and 130 also comprises a horizontal electrode-forming roll 138 and a set of upper and lower vertical electrode-forming rolls 139 and 140 each of which is of copper or other high conductivity metal. The rolls 138 which are located in the same horizontal plane as that occupied by the web-forming section 41 are located at opposite sides of the work and so spaced apart as to press the ribs 43 of the flange-forming sections 42 forcibly against the adjacent longitudinal edges of the web-forming section 41 during the application of welding current thereto. The upper rolls 139, the axes of which are in the same vertical plane as the axes of the adjacent rolls 138, are disposed above, and in engagement with, the upper surface of the web-forming section 41 adjacent its longitudinal edges and the lower rolls 140, the axes of which are also in the same vertical plane as the axes of the adjacent rolls 138, are disposed below, and in engagement with, the undersurfaces of the web-forming section 41 and of the ribs 43 on sections 42. The peripheral line contacts between the electrode-forming rolls, above referred to, and the flange-forming sections 42 at each side of the apparatus, are thus disposed in a common plane crosswise of the apparatus.

The lower rolls 140 (Figs. 24 and 33) are secured to shafts 141 rotatably mounted in the frames 132, each shaft 141 having a bevel gear 142 and a spur gear 143, rotatable therewith, the spur gears 143 (Figs. 19 and 21) meshing with gears 144 carried, and driven, by a main drive shaft 145, shown as driven from a power device (Fig. 5), such as an electric motor represented at 146, through an interposed speed reducer mechanism 147. Each spur-gear 143 (Fig. 24) is connected with a sleeve 143ª to which the gear 142 is splined as represented at 142ª, thereby permitting of the shifting of the gears 142 along the shaft 141 without disturbing the driving connections therewith.

The gears 144 are provided with extensions 148 (Figs. 19 and 25) fitting about the shaft 145 and forming journals therefor, and interposed between the gears 144 and the sides of the frames 132 opposite thereto and surrounding the shaft 145, are spacers 149, the gear 144 and its extension 148 and spacer 149 on the section 130 being slidable, with the frame 132 of this section, along the shaft 145 in the lateral adjustment of this section relative to the section 129.

The upper rolls 139 are secured to shafts 150 journalled in rock-frames 151 pivoted on shafts 152 disposed to one side of the shafts 150 and journalled in upwardly extending journalling uprights 153 and 154 on the opposite sides of the frames 132; the shafts 152 being provided with gears 155 which mesh with the gears 144 and with gears 156 secured to the shafts 150.

The horizontal rolls 138 are connected with vertical shafts 157 journalled in boxlike frames 158 mounted on the frames 132, respectively, and slidable crosswise of the apparatus and held against displacement in a direction lengthwise of the apparatus by splines 159 on the inner side portions of the frames 132 and extending into longitudinal keyways 160 in the undersides of the frames 158 (Fig. 24) and by clip members 161 and 162 (Figs. 1 and 20) on the outer side portions of the frames 132 and overlapping flanges 163 and 164, respectively, on the frames 158; the shafts 157 being provided at their lower ends with bevel gears 165 which are driven by the bevel gears 142, respectively, on the shafts 141.

It will thus be understood that all of the rolls 138, 139 and 140 are driven by the drive shaft 145 simultaneously in the direction of the feed of the work through the apparatus.

The purpose of mounting the rolls 139 on the rock frames 151 is to adapt them for operating on web-forming sections 41 of different thicknesses and to permit of ease of introduction of the work into position between the rolls 139 and 140.

Any desirable means for controlling the positions of the rock frames 151 may be provided, those shown comprising piston and cylinder mechanisms 166 (Figs. 19, 20, 23, 25).

Each piston and cylinder mechanism 166 comprises a lower open-top cylinder 167 fulcrumed to the adjacent frame 132 on a horizontal pivot 168, an upper open-bottom cylinder 169 vertically alined, and connected with, the cylinder 167 in spaced relation thereto, as by tie rods 170, and an intermediate piston member 171 having cylindrical upper and lower piston portions 172 and 173 slidable in the cylinders 167 and 169, respectively, and connected together by spaced apart bars 174 at which the piston member is pivotally connected, by a cross pin 175, to a lug 176 provided on the adjacent frame 151 opposite the end at which the roll 139 is carried.

The piston members 171 are actuated in one direction to lift the rolls 139 and in the other direction to press these rolls forcibly against the web-forming section 41 in the welding operation, by fluid pressure controllably supplied in any desirable way (not shown) to the cylinders 167 and 169, beyond the piston heads 172 and 173, through pipes 177 and 178, respectively.

The positions of the slidable frames 158 carrying the rolls 138 are controlled by mechanisms represented at 179 (Figs. 5, 19, 20 and 24) and carried by the frames 132, each of these mechanisms comprising piston and cylinder mechanism of the same general construction as the piston and cylinder mechanisms 166, the open-ended cylinders thereof being represented at 180 and 181, the piston, cooperating with these cylinders, at 182 and the pipes for supplying fluid pressure to the cylinders 180 and 181, at 183 and 184, the cylinder 181 being shown as vertically adjustable relative to the lower cylinder 180 by means of the upright rods 181ᵃ connected with the cylinder 180 and extending through bosses on the cylinder 181 and provided on their upper threaded ends with nuts 181ᵇ by which the cylinder 181 is clamped to the rods 181ᵃ.

The pipes 183 and 184 are shown as leading to valve mechanism represented diagrammatically at 179ᵃ and controlling the supplying of fluid pressure from a suitable source thereof, alternately to the cylinders 180 and 181 and the exhaust therefrom, the valve mechanism being of such construction as commonly known that when in one position it connects the cylinder 180 to the supply of fluid pressure and opens the cylinder 181 to exhaust and when moved to another position connects the cylinder 181 with the supply of fluid pressure and opens the cylinder 180 to exhaust.

The piston 182 engages, at a ball and socket joint 185 comprising a sliding socket block 135ᵃ, with the outer end of a bell crank lever 186 fulcrumed at 187 to lugs 188 rising from the frame 132 beneath it, the bell crank 186 being pivoted at 189 to the outer end of a link 190 pivoted at 191 to the frame 158, whereby the frames 158 may be moved outwardly to facilitate the introduction of work into the welding mechanism and inwardly to cause the rolls 138 to press against the flange-forming sections 42 with the desired pressure.

The upper end of the cylinder 181 forms a stop surface with which the piston 182 engages, under the action of the fluid pressure introduced into the lower cylinder 180, following a slight compression (as for example about one-sixteenth inch in the case of light beams and about one-quarter to five-sixteenths inch in the case of heavy beams) of the heated work by the force of fluid pressure; it being preferred, however, that the pressure exerted by the fluid pressure be such as to compress the heated surfaces of the portions of the work in normal condition slightly less than is required to bring the stop means referred to into action. By thus limiting inward movement of the electrode 138 beyond a predetermined point such unevenness of the finished beam as would result if no stop means were provided, is avoided; and by providing for the compression of the heated metal as stated, the existence of shallow depressions in either of the opposing surfaces of the work will not result in a break in the continuity of weld across the depressions as the metal at the depression will still be under sufficient compression to effect a weld across such depressions.

While it is desirable that the force applied by the electrode 138 against the work flange be sufficient, in the above-referred-to stopped position of the electrode, to compress the edges of the heated work as stated, it is also desirable that this force be a yielding one in order that the electrode may yield outwardly in the event that in the movement of the work along the machine the work sets up a resistance between it and the electrode 138 materially greater than the force required to hold the electrode in inwardly stopped position, such for example where the flange-forming member presents a hump or bulge which it is not practicable to remove in the welding operation.

In the machine illustrated such yielding pressure is provided for by the fluid pressure mechanism referred to. In the case of the use of a gas, such as for example compressed air, as the operating fluid pressure, the gas would be supplied at a pressure sufficient to apply the desired pressure to the electrode 138 as above stated and being compressible would permit the electrode to yield outwardly when the excess resistance afforded by the work as above referred to is encountered. In the case of the use of a liquid as the operating fluid pressure, any desirable means for affording the desired yield of the electrode in the event of the excess resistance just mentioned, may be provided as for example an air chamber shown at 183ᵃ and in communication with the pipe 183, the air in the chamber 183ᵃ being compressed by the liquid when placed under pressure and forming an air-cushion functioning to render the electrode yieldable, for the purpose stated.

It may here be stated that any suitable means for controlling the degree of compression of the work at the zone to be welded may be provided. Thus, by way of example, the cylinder 181 is made adjustable, as above described, toward and away from the cylinder 180 which controls the stroke of the piston 182 and consequently the degree to which the work is compressed.

Referring now to the more specific details of the connection between the rolls 138, 139 and 140 and their supporting and driving shafts and to the mechanisms for supplying welding current to these rolls and to means provided for preventing the rolls from becoming unduly heated:

Each roll 138 is formed of a hub portion 192 at which it is secured to the shaft 157, an outer rim portion 193 at which the roll 138 bears against the work, and upper, lower, and intermediate spaced apart disk portions 194, 195 and 196 connected with the hub 192 and rim 193, the intermediate disk portion 196 having openings 197 therethrough communicating with the spaces above and below this disk.

The shaft 157 is shown as journalled in the frame 158 at roller bearings 198 and 199 insulated, as represented at 200 and 201, from the frame 158, the shaft 157 also being insulated from the gear 165 by an insulating bushing 202.

Associated with each roll 138 are upper and lower non-rotatable current-conducting members 203 and 204 shown as of general disk form with which the upper and lower surfaces of the roll 138, at its disks 194 and 195, are in flatwise rubbing contact.

The upper disk 203 which is connected with flexible buss-bars 205 (Fig. 23) is connected with the lower ends of parallel upwardly extending rods 206 which are slidable in insulating bushings 207 in the frame 158, the upper ends of the rods 206 (Figs. 20, 23 and 24) being connected with one end of a lever 208 fulcrumed between its ends, and indicated at 209, to an upright 210 on the frame 158 and provided at its other end with a weight 211 adjustable therealong and serving as a means for regulating the pressure contact between the disk 203 and the roll 138.

The lower disk 204, which is connected with flexible buss-bars 212, is connected with the upper ends of parallel vertical rods 213 which slide through insulated bushings 214 on the frame 158, the lower ends of these rods being connected with one end of a lever 215 fulcrumed between its ends as indicated at 216 to lugs 217 depending from the frame 158, the other end of this lever carrying a weight 218 adjustable therealong and serving to cause the disk 204 to exert the desired contact pressure against the underside of the roll 138.

Provision is made for maintaining the rolls 138 in the desired cool condition as by providing for each roll an inlet pipe 219 which leads from any suitable source of cooling medium through a stuffing box 220 in the lower end of the shaft 157 and communicates with an inlet passage 221 in the shaft which opens into the space between the disks 195 and 196; and by providing for each shaft an outlet pipe 222 extending through a stuffing box 223 in the upper end of the shaft and communicating with an outlet passage 224 in the shaft and opening into the space between the disks 194 and 196, the cooling medium, supplied through the inlet pipes 219 circulating through the spaces in the rolls and discharging through the outlet pipes 222.

Provision is also made for cooling the current-conducting disks 204 and 205 by providing these disks of hollow construction, as for example as shown, wherein each disk contains an annular chamber 225, cooling medium being introduced into these spaces through inlet pipes 226 and from these spaces through outlet pipes 227.

Each roll 140 (Fig. 32) is formed of a main roll section 228, of copper or other suitable current conducting metal, provided with a hub portion 229 surrounding a closed-end insulating bushing 230 mounted on the shaft 141, the shaft 141, bushing 230, and roll 140 being secured together for rotation as a unit and the shaft 141 being journalled at its ends in roller bearings 231 and 232 at opposite sides of the frame 132 and at roller bearings 233 at an intermediate portion of this frame (Fig. 24).

Each roll 140 also comprises a ring section 234 mounted in an annular recess 235 in the outer face of the roll-section 228 and insulated therefrom as indicated at 236, the ring section 234, which is annularly recessed as indicated at 237 to receive the bead hereinafter referred to and produced in the welding operation at the juncture of the web-forming section 41 and the flange-forming section 42, engaging the underside of the rib 43 of the adjacent flange-forming section 42.

Associated with each roll 140 is a non-rotatable current-conducting member 238 comprising a disklike portion 239 which has journal fit in an annular recess 240 in the outer face of the roll section 228 and flatwise contacts this roll section, the member 238 also having a hub portion 241 at which it is rigidly connected with the frame 132 by bolts 242 with interposed insulation represented at 243, 244 and 245, the current being conducted to the members 238 by buss-bars 246.

The desired pressure contact between each roll 140 and the current-conducting member 238 associated therewith is obtained by means of an expansion coil spring 247 interposed between a nut 248 on the outer end of the shaft 141 and the bearing 232 for this shaft, this spring tending to constantly urge the roller 140 into engagement with the current conducting member 239 (Fig. 24).

Provision is made for cooling the rolls 140 by recessing the inner face of each roll section 228 as represented at 249 with its peripheral margin deeply annularly recessed at 250, and providing a cover plate 251 across the face of the roll section 228 and an intermediate spaced apart partition-forming disk 252, the cover plate being secured to the bushing 230 and to the roll section 228 as by the screws represented at 253 and 254 and the partition 252 secured to this bushing by screws represented at 255. The spaces between the roll section 228, partition 252 and cover plate 251 form cooling medium circulatory spaces supplied with any suitable cooling medium through a pipe 256 extending through a passage 257 in the shaft 141 and spaced from the walls thereof and opening into the space between the cover plate 251 and the partition 252 through passages 258 in the bushing 230 and communicating with the pipe 256, the cooling medium discharging from the space between the partition 252 and the roll section 228 through passages 259 in the bushing and thence to the space between the pipe 256 and the wall of the passage 257 in the shaft 141, to a stationary hollow head 260 held to the frame 132 by rods 261, from which head the cooling medium discharges through a pipe 262, suitable stuffing boxes 263 and 264 sealing the joints between the head 260 and the shaft 141 and pipe 256.

Provision is made for cooling the current-conducting members 238 by forming them of sections 265 and 266 as shown, the section 265 having in its outer face arcuate recesses 267 separated by radial partitions 268 and 269, the latter containing openings 270 therethrough and the section 266 forming a cover plate. The pipes 271 and 272 communicating with the recesses 267 at opposite sides of the partition 268, serve to conduct cooling medium into and from these recesses.

Each roll 139 is of the same construction as the rolls 140 and is mounted on its supporting shaft 150 and cooled in the same way and supplied with current in the same way, as explained of the rolls 140, except that none of the rolls 139 is provided with a rib-engaging portion corresponding with the ring section 234 of the roll 140. The current-conducting members by which current is supplied to the rolls 139 and which correspond with the current-conducting members 239 are represented at 273 and are rigidly secured to the frame 151 by bolts 274, the members 273 being connected with flexible buss-bars 275. The pipes through which the cooling medium is supplied to the rollers 139 and corresponding with the pipes 256, are represented at 276 and the discharge pipes corresponding with the pipes 262, at 277.

The rolls 139 are constantly urged against the current-conducting members 273 associated therewith in the same way as in the case of the rollers 140, the coil springs provided for this purpose and corresponding with the coil springs 247 being represented at 278 and interposed between nuts 279 and adjacent bearings 280 for the shafts 150.

Means are provided for maintaining the rolls 138, 139 and 140 free from scale or other objectionable substances that may become deposited thereon in the welding operation, these means comprising scraper blades 138ª, 281 and 282 (Figs. 25, 26 and 27) supported, for adjustment toward the peripheries of these rolls, respectively, on the members 158, 273 and 238, respectively.

The apparatus also comprises means adjacent the welding rolls for insuring accurate straight line travel of the web-forming section 41 and preventing buckling thereof during the welding operation. These means comprise a horizontal lower series of rollers 283 disposed lengthwise of the apparatus in position to engage the underside of the web-forming section 41. These rollers are supported on parallel bars 284 (Figs. 21 and 22) extending lengthwise of the apparatus and supported at their downwardly recessed portions on cross bars 285 and 286 carried by the frames 132, cap plates 287 secured to the bars 284 holding the latter in place. The upper surfaces of the bars 284 are longitudinally channeled at 288 to receive the rollers 283 and support the journalling pins 289 therefor.

These means also comprise a horizontal upper series of rollers 290 disposed lengthwise of the apparatus and in vertical alinement with the respective rollers 283 and in position to engage the upper surface of the web-forming section 41. The rollers 290 are supported on parallel bars 291 extending lengthwise of the apparatus and supported at their downwardly recessed end portions on cross bars 292 and 293. The bar 292 is carried by uprights 294 and 295, the uprights 294 being secured to the flanges 135 and 136 of the beams 45 and 46 by the bolts 136a; and the brackets 295 are secured to the frames 132. The bar 293 is supported on the stands 137, the support of the bar 293 toward its opposite ends being at lugs 296 on these stands. Cap plates 291a secured to the bars 291 hold the latter in place.

The undersurfaces of the bars 291 are longitudinally channeled at 298 to receive the rollers 290 and support the journalling pins 297 therefor.

To adapt the roller mechanisms above described for use with web-forming sections 41 of different thicknesses, the bars 291 are adapted for vertical adjustment on the bars 292 and 293, these bars being held in the desired position of adjustment by inserting the shims, such as those represented at 299 and of suitable thicknesses, between the bars 291 and the bars 292 and 293 as shown.

To insure against vertical displacement of the flange-forming sections 42 in their passage through the apparatus, the upper edges of these sections are engaged by the grooved peripheries of rollers 300 (Figs. 28–30) located at opposite sides of the apparatus and journalled at 301 on rock members 302 horizontally pivoted at 303 on slides 304 vertically adjustable on the members 137a of the stands 137 and adapted to be held in adjusted position, to accommodate flange-forming sections 42 of different widths, as by the screw devices represented at 305. Coiled springs 306 interposed between the members 137a and the members 302 serve to force the rollers 300 with the desired great force downwardly against the upper edges of the flange-forming sections 42. Stops 307 screwed on the outer threaded ends of studs 308 carried by the members 137a and extending through the members 302, limit the swinging of the members 302 in a direction for lowering the rollers 300, when no work is in engagement with these rollers. The stops 307 being adjustable afford means whereby the rollers 300 may be caused to lower to the minimum extent below the upper edges of the flange-forming sections 42, when no work is in the machine and still render the rollers subject to the action of the springs 306 upon the engagement of the sections 42 therewith, regardless of the wear of these rollers and thus the minimum resistance to the introduction of the sections 42 into operative engagement with the rollers, is presented.

It is desirable that the flange-forming sections 42 be subjected to continuing pressure for forcing them toward the web-forming section 41 until the welds have set sufficiently to insure against impairment thereof in the continued travel of the work through the apparatus; and to this end I provide sets of rollers 309 and 310 (Figs. 25, 29, 31 and 35) at opposite sides of the apparatus and which press against the outer faces of the sections 42 in the horizontal plane of the ribs 43.

The rollers 309 are journalled on bell crank levers 311 fulcrumed at 312 on the members 137a of the stands 137 and cooperating therewith are coil springs 313 and adjustable stop means 314, as in the case of the rollers 300, for causing them to press against the flange-forming sections 42 with the desired force.

The rollers 310 are journalled at shafts 315 (Fig. 35) in cylindrical plungers 316 slidable in openings 317 in the members 137a, keys 318 on the members 137a and extending into keyways 319 in the plungers 316 preventing rotation of the latter. Coil springs 320 operate to force the rollers 310 against the flange-forming sections 42 with the desired force. At the back ends of the openings 317 are stationary nuts 321 between which and the adjacent ends of the plunger 316 the coil springs 320 are interposed. Threaded in the nuts 321 are screws 322 which extend into sockets 323 in the plungers 316 and contain peripheral grooves 324 into which stop screws 325 on the plungers 316 freely extend permitting limited lengthwise movement of the plungers relative to the screws 322 under the action of the springs 320. The adjustable stop means thus provided for the plungers 316 serve the same purpose as that above explained of the stop means 307 for the roller devices 300.

It may here be stated that in the welding together of the sections 41 and 42 by current supplied to the welding rolls above referred to, as for example as hereinafter described, beads represented at 326, are formed (by the upsetting of the adjacent edges of the metal sections under the pressure exerted by the rolls 138 against the flange-forming sections 42) at opposite faces of the web-forming section 41 at the joints between the latter and the flange-forming sections 42, which it is desired be eliminated in the finished structure. To this end the apparatus is provided at the rear of, and close to, the welding rolls above described, with shearing means comprising a pair of knives 327 and 328 (Figs. 22, 26 and 27), located, respectively, above and below the welded article and extending crosswise thereof, and serving, as the article moves through the apparatus, to shear off the beads 326, while hot, to condition the article as shown in Figs. 4 and 36, the knives 327 and 328 being supported on hangers 329 and 330 secured to the bars 293 and 286, respectively. The hangers 329 and 330 are formed of main sections presenting recesses 331 and 332 at which they straddle the bars 293 and 286, and cap plates 333 and 334 securing these hangers in place and permitting of the use of shims, such as those represented at 335, between the hangers and the bars 293 and 286 to compensate for wear of the knives 327 and 328 and for the vertical adjustment of the upper knife 327 to accommodate web-forming sections 41 of different thicknesses.

Means for guiding the article to position between the knives 327 and 328 are provided, these means comprising upper and lower rollers 336 and 337 journaled in the hangers 329 and 330 to engage the upper and undersurfaces of the web-forming section 41 and two slanting-face shoes 338 and 339 carried by the hangers 329 and 330, respectively, and disposed above and below the web-forming section 41, the slanting faces of these shoes serving as a means for guiding the web-forming section 41 into the proper registration with the space between the rollers 336 and 337.

The apparatus also comprises roller mechanism located beyond the knives 327 and 328 and serving as means for feeding the welded article and smoothing it at the welds. These means comprise parallel square shafts 340 and 341 (Fig. 34) extending crosswise of the apparatus and located above and below the path of travel of the welded article and journalled in the stands 137; an upper series of spaced-apart rollers 342—345 on the upper shaft 340 between the stands; and a lower series of spaced-apart rollers 346—349 on the lower shaft 341 in vertical alinement with the rollers 342—345, respectively, the rollers 342—349 being driven by the shafts carrying them, and the end rollers 342, 345, 346 and 349 disposed at the interior angles of the welded article and thus in registration with the welds.

The end rollers 342, 345, 346 and 349 are provided with shouldered sleeve-extensions 350 surrounding, and driven by, the shafts 340 and 341 and journaled in boxes 351 containing shouldered bushings 352, the boxes 351 being vertically adjustable in openings in the stand-members 137ᵃ and 137ᵇ.

The boxes 351 for the upper shaft 340 are carried by bolts 353 and are held down, to cause the rollers 342—345 to press, with the desired force, against the upper surface of the web of the welded article, by screws 354 threaded in the stands 137 and engaging the boxes 351, the bolts 353 serving to prevent undue lowering of the rollers 342—345 in the passing of the article beyond them, and to maintain the boxes against lateral displacement.

The boxes 351 for the lower shaft 341 are connected with bolts 355 which prevent lateral displacement of the boxes, adjusting screws threaded in the stands and engaging the undersides of these boxes adapting the rollers 346—349 to be vertically adjusted to compensate for wear.

The shafts 340 and 341 are connected together for simultaneous operation at the same speed and in the direction of travel of the work, by gear mechanism (not shown) in a housing 357, with flexible couplings 358 interposed, the housing 357 also comprising speed reducer mechanism of any desirable construction (not shown) driven from a source of power, as for example the electric motor represented at 359. The shafts 340 and 341 may be driven, if desired, at such speed that the rollers driven thereby will travel at a different peripheral speed, either greater or less, than that of the rolls 139 and 140 to thereby produce a certain amount of slippage between the flange-forming sections 42 and the rollers 139 and 140 and thus produce better electrical contact between these parts to avoid pitting, which pitting, if occurring, becomes cumulative and results in poor electrical contact.

As will be understood from the foregoing, the stand 137 of section 129 being movable toward and away from the opposite stand, the rollers 342 and 346 will move therewith along the shafts 340 and 341 in the adjusting of the section 129 for operation on work of different sizes, the desired spacing of the intermediate rollers 343, 344, 347 and 348 being effected by separately adjusting them along the shafts 340 and 341.

The apparatus is also provided with a feed-out table 360 (Figs. 1, 5, 23 and 36) comprising parallel spaced-apart channel girders 361 and 362 located at opposite sides of the apparatus and supported on transverse beams 363 as in the case of the beams 45 and 46 and engaging at bolts 364 thereon with undercut ways 365 in the beams 363, the girders 361 and 362 being rigidly connected at flanges on their ends with the stands 137 as shown at 366 of the girder 362 in Fig. 23; it being intended that the girder 362 be adjustable on the beams 363 toward and away from the girder 361 to adapt the table for receiving work of different sizes.

The table 360 also comprises transversely disposed rotatable square shafts 367 disposed at intervals along the girders 361 and 362, each of these shafts carrying a set of rollers 368—371 driven thereby and so disposed as to support the welded article at its web-portion (Fig. 36), the rollers 368 and 371 having hubs 372 and 373 in driving engagement with the shafts 367 and shouldered to hold the rollers 368 and 371 against lengthwise movement on the girders. Thus when the girder 362 is adjusted toward or away from the girder 361 the rollers 368 slide with the girder 362 along the shafts 367 to thus adjust these rollers for work of different sizes, the intermediate rollers 369 and 370 being separately adjustable along these shafts for the desired spacing.

The feed-out table may be of any desired length, the shafts 367 of any desired number, and any one or more of these shafts be positively driven. In the drawings one only of the shafts 367 is shown as positively driven, this being effected by means of a power device, such as the electric motor represented at 374 (Fig. 5) flexibly connected by a coupling 375 to a speed reducer 376 which in turn is connected, by means of a flexible coupling 377, with the shaft 367 to be driven.

As will be understood from the foregoing, the beam 46, the welding mechanism section 130 and the girder 362 are rigidly connected in end-to-end relation to, in effect, form a unitary structure adjustable toward and away from the structure comprising the beam 45, the welding mechanism section 129, and the girder 361, thereby to adapt the machine for the production of beams or columns, of widely different depths, the unitary adjustable structure thus provided being associated with adjusting means shown as comprising threaded rods 378 (Figs. 5, 6, 17 and 18) rigidly connected with, and extending laterally from, the beam 46, the yoke 132 of welding mechanism section 130, and the girder 362. The rods 378 engage the threads of nuts, one of which is represented at 379 in Fig. 18, journalled in housings 380 and carrying worm wheels 381 rigid therewith, these worm wheels meshing with worms, one of which is represented at 382 in Fig. 18, rigid on a shaft 383 driven from a power device, such as an electric motor represented at 384, through the medium of a speed reducer 385 flexibly connected at 386 and 387 with the motor 384 and the shaft 383.

Current may be supplied, in any suitable way, to the welding electrodes described during their rotation in the feed of the work, as for example by any one of the circuit arrangements shown in Figs. 38, 39 and 40.

Referring to Fig. 38 which shows a circuit diagram involving the use of direct current, two direct current generators represented at 388 and 389, are provided. One terminal of the generator 388 connects with a wire 390 leading from the buss bars 205 and 212 of the current-conducting members 203 and 204 of the electrode roll 138 at one side of the apparatus. The other terminal of the generator 388 connects with a wire 391 which leads to the buss bars 275 and 246 of the current-conducting members 273 and 238 of the rolls 139 and 140 at this same side of the apparatus, with a circuit opening and closing switch 392 in the wire 391. The generator 388 thus serves to supply current to the flange roll electrode 138 and to the web roll electrodes 139 and 140 at one side of the apparatus.

One terminal of the generator 389 connects with a wire 393 leading from the buss bars 205 and 212 of the current-conducting members 203 and 204 of the electrode roll 138 at the opposite side of the apparatus, the other terminal of this generator connecting with a wire 394 leading from the buss bars 275 and 246 of the current-conducting members 273 and 238 of the rolls 139 and 140 at this same side of the apparatus, with a circuit opening and closing switch 395 in the wire 394. The generator 389 thus serves to supply current to the flange roll electrode 138 and the web roll electrodes 139 and 140 at the side of the apparatus opposite that at which the electrode rolls supplied with current from the generator 388, are located.

The generators 388 and 389 which should be of the low voltage type and capable of producing currents in the order of 250,000 amperes, are provided with separately excited fields with adjustable rheostats in circuit therewith whereby the current produced by each of the generators 388 and 389 may be adjusted to suit the existing conditions. To this end the field winding of the generator 388 and represented at 396 is connected at one end with a wire 397 connected with a wire 398 forming one of the line wires, the other of which is represented at 399, leading from any suitable source of current for energizing the field winding 396, and the other end of the field winding 396 being connected by a wire 400 with the movable contact element of a rheostat 401, the winding of which, represented at 402, is connected by a wire 403 with the line wire 399.

The field winding for the generator 389 is represented at 404 and is connected at one end, by a wire 405, with the line wire 398 and at its other end, by a wire 406, with the movable contact member of a rheostat 407 the winding of which, represented at 408, is connected by a wire 409 with the line wire 399, it being understood that the movable contacts of the two rheostats 401 and 407 are independently movable.

Referring to the diagram shown in Fig. 39 which involves the use of alternating current employing a two-phase circuit, the four line wires leading from a suitable generator (not shown) for supplying the current to a two-phase circuit, are represented at 410, 411, 412 and 413, the wires 410 and 411 constituting one phase of this two-phase circuit being connected with the primary winding 414 of an adjustable transformer 415 and having interposed therein a circuit opening and closing switch 416. The secondary winding 417 of the transformer 415 is connected at one end with a wire 418 leading from the buss bars 205 and 212 of the current-conducting members 203 and 204 of the electrode roll 138 at one side of the apparatus, the opposite end of the secondary winding 417 being connected with a wire 419 leading from the buss bars 275 and 246 of the current-conducting members 273 and 238 of the electrode rolls 139 and 140 at this same side of the apparatus.

The wires 412 and 413 of this two-phase circuit are connected with the primary winding 420 of an adjustable transformer 421 and contains a circuit opening and closing switch 412ᵃ. The secondary winding of the transformer 421 and represented at 422 is connected at one end with a wire 423 leading from the buss bars 205 and 212 of the current-conducting members 203 and 204 of the electrode roll 138 at the opposite side of the apparatus, and at its opposite end with a wire 424 leading from the buss bars 275 and 246 of the current-conducting members 273 and 238 of the electrode rolls 139 and 140 at this same side of the apparatus.

If desired, the two-phase current could be obtained from any available standard three-phase supply by well known methods of transformation (not illustrated). Furthermore, the two circuits comprising the wires 410 and 411 and the wires 412 and 413, respectively, instead of being supplied with current from either a two-phase or a three-phase supply (in the latter case through transformation as above suggested), may be supplied with current from two independent single-phase sources.

Referring to the diagram shown in Fig. 40, which involves the use of alternating current employing a three-phase circuit one phase of which is applied to the upper electrode rolls 139 and to the lower electrode rolls 140, and the other two phases thereof applied, respectively, to the electrode-forming rolls 138, the three leads for the three-phase circuit supplied with current from any suitable source of three-phase supply, are represented at 425, 426 and 427 and are equipped with circuit opening and closing switches 428, 429 and 430, respectively. In this arrangement three adjustable transformers represented at 431, 432 and 433 are employed. The wire 425 connects, by a wire 434, with one end of the primary winding 435 of the transformer 431 and also with the adjustable tap of the primary winding 436 of the transformer 432. The wire 426 connects by a wire 437 with the primary 436 of the transformer 432 and also with the adjustable tap of the primary winding 438 of the transformer 433, the primary winding 438 and the tap for the primary winding 435 being connected, respectively, by wires 439 and 440 with the wire 427.

The secondary windings of the transformers 431, 432 and 433 are represented at 441, 442 and 443, respectively, the secondary winding 442 being connected in series with the secondary windings 441 and 443 by wires 444 and 445. The secondary windings 441 and 443 are connected together by a wire 446, the connections just described constituting a closed circuit in which the secondary windings 441, 442 and 443 are arranged in series.

The wire 444 connects with a wire 447 leading from the buss bars 205 and 212 of the current-conducting members 203 and 204 of the electrode roll 138 at one side of the apparatus. The wire 445 connects with a wire 448 leading from the buss bars 205 and 212 of the current-conducting members 203 ad 204 of the electrode roll 138 at the opposite side of the apparatus.

The wire 446 connects with a wire 449 connected with a wire 450 which leads from the buss bars 275 of the current-conducting members 273 of the upper electrode rolls 139, and also from the buss bars 246 of the current conducting members 238 of the lower electrode rolls 140.

The switches 392 and 395 in Fig. 38, 416 and 412a in Fig. 39, and 428, 429 and 430 in Fig. 40 are provided to permit the current to be applied after the parts to be welded together have become positioned in the welding mechanism and flow of current thereto discontinued immediately before the article leaves the welding mechanism, whereby the welding rolls are not required to perform the function of switches which would cause them to become burned and interfere with the satisfactory operation thereof.

In the operation of the apparatus the web and flange-forming sections 41 and 42, associated with the several rollers of the table 44, as above described, feed into the welding mechanism which operates to cause the welding current to pass between the ribs 43 and the adjacent edges of the web-forming section 41 at which portions the current is concentrated, and under the pressure exerted by the rolls 138, which force the ribs 43 against the edges of the section 41, the continuous welding together of the web and flange-forming sections under heat and pressure is effected. The roller mechanisms 115, adjustable crosswise of the apparatus as above described, afford means whereby the flange-forming sections 42 may be caused to extend at such acute angles relative to the web-forming section 41 that the sections 42 may be maintained separated from the sections 41 substantially to the place at which the sections 42 become engaged by the flange rolls 138, thus aiding in the concentration of the welding current on the work, the roller mechanisms 115 being preferably adjusted into such positions that the flange-forming sections 42 will be bent outwardly away from the web-forming section 41 to such extent as to cause the sections 42 to be stressed beyond their elastic limit.

One of the most important phases of my invention consists in providing for the production of built-up beams or columns in which the flange-forming sections are rolled independently of the web-forming sections and these parts thereafter welded together to form the beams or columns, whereby wide ranges of combinations of flange-forming sections and web-forming sections, without the restrictions imposed in the rolling of integral beams or columns, may be produced.

As is well known in the art of rolling beams or columns as integral structures, the web of the beam or column, to avoid buckling resulting from the unequal rates of cooling of the different portions of the beam or column, must be not less than a certain minimum thickness and must bear some relation to the dimensions of the flanges, and of greater thickness in the case of beams or columns of certain dimensions than that required to properly resist the stresses which are imposed on them in use. Furthermore, in accordance with the customary method of producing beams or columns as integral rolled structures, those presenting additional strength and weight are produced by rolling the flanges of greater thickness while maintaining the same spacing between the inside faces of the flanges to avoid the necessity for separate sets of rolls for each change in weight of the beam or column, and thus the beams or columns of different flange thicknesses and weight are of different back-to-back dimensions.

In producing beams or columns in accordance with my invention, involving the independent rolling of the web-forming sections and the flange-forming sections, there is no requirement for a minimum thickness of web relative to the dimensions of the flanges to avoid distortion of the web in cooling as in the case of an integral rolled beam or column; nor do commercial requirements dictate the making of beams or columns of the same general size, but of different weights and strength, of different back-to-back dimensions.

The web of a beam or column must be so designed that it will not buckle under the desired loading and will not be subject to too great shearing stresses. This being the only requirement of the web, ideal designs of beams or columns of widely varying combinations of webs and flanges of different sizes may be produced in accordance with my invention by the use of the minimum of metal and in which the greatest section modulus, with the concentration of all the metal possible in the flanges, is obtained.

Thus web-forming sections of given dimensions may be used with a variety of flange-forming sections in which the thickness and width of the flanges and the thickness of the ribs thereon may be independently varied within wide ranges, it being desirable, however, that the ribs be of a thickness approximating that of the web-forming section to insure a good weld and equal heating of the metal on both sides of the weld.

Series of beams or columns of the same back-to-back dimensions, but of different weight and strength, may be readily produced by the invention inasmuch as it is only necessary to shear the web-forming sections to the requisite width to suit the combination of flange-forming sections for maintaining the back-to-back dimension of the beams or columns constant for any particular series. By way of example, all 16 inch beams would be 16 inch back-to-back independent of the weight per foot of the combined section.

Furthermore, as will be understood, the thickness and width of the flange-forming sections and the thickness and height of the ribs thereon, may be independently varied to suit the type of column or beam it is desired to produce. Thus, by way of example, with the flange portion 8 inches wide, the thickness dimension of the flange may vary between ⅜ inch and 2 inches, while at the same time the thickness dimension of the rib may vary from about ¼ inch to say about 1 inch or more and the height dimension of the rib varied to insure sufficient projection of the rib beyond the flange to permit of a proper weld without too rapid conduction of the welding heat to the large area of the flange.

The provision of the roller mechanisms 115, adjusted to stress the flange-forming sections 42 beyond their elastic limit, in accordance with the preferred use of the mechanisms 115, and the provision of the electrodes 138 as rollers, particularly in combination with the yielding feature above described, of the electrodes 138, are of great advantage.

In this connection it may be stated that as the welding continues, in the movement of the work, the current flashes across the space between the separated parts of the work immediately in front of the juncture of these parts at the weld. This produces preheating of the work which should be uniform else the resistance of the work to the current flow at the welding zone will vary and thus produce non-uniform current flow with resultant objectionable variation in weld.

As a factor in insuring such uniform current flow the flange-forming sections 42 are bent, as above stated, beyond their elastic limit, thus causing them as they approach the opposite edges of the web-forming section 41 to assume true curved form, such flat spots as may be present in the sections 42 in their normal condition being removed in the bending operation stated, the yielding characteristic of the electrodes 138 also contributing to uniform current flow inasmuch as thereby the speed of travel of the work, necessary to be maintained substantially a constant to avoid overheating of the work, is not materially affected should a raised hard spot in the work be encountered.

By providing the electrodes 138 as rollers the flange-forming sections 42, are caused in their deflected condition, to extend in contact with an appreciable portion of their curved peripheries thereby causing the sections 42 to engage the electrodes 138 at area contacts, as distinguished from line contacts, with resultant decrease in contact losses.

In accordance with the improved method herein described, the flange-plates are formed, in the rolling process, with rudimentary longitudinal ribs; these flange-plates and the web-plate which is to be united to the flange-plates to form a built-up structural member are assembled in such relation that the edges of the rudimentary ribs are presented to the edges of the web-plate; and the assembly is subjected to the action of welding-current and pressure to form continuous welded seams between the edges of the web-plate and the contiguous edges of said rudimentary ribs. Preferably, the operation is carried out by continuous movement of the assembly between revoluble pressure-applying electrodes so arranged that one electrode engages the outer surface of the flange-plate and two electrodes engage opposite sides of the web-plate across, or back of, the joint between the edges of the rudimentary ribs and the web-plate. Also, preferably, the welding is effected during the passage of the assembly through or between the electrodes, and the assembly then passes between pressure-rolls which engage the weld-seam, these pressure-rolls having rounded corners which conform to the junction between the rudimentary rib and its flange-plate and which operate to produce smoothness of joint and tend to prevent warping, or buckling, of the built-up web which is composed of the original web-plate and the rudimentary ribs with which the flange-plates are provided in the rolling process. While the process is illustrated in connection with the manufacture of a built-up I-beam, it will be understood that it is not limited thereto, but may be applied to the manufacture of other structural shapes, such as T-beams.

Experience has demonstrated that it is possible, by providing the flange-plates with rudimentary longitudinal ribs, or flanges, to unite p`ates by an electric welding process which is applicable to the manufacture of heavy structural members.

While I have illustrated and described a particular way of practicing my improved method and have illustrated and described a particular construction of apparatus suitable for practicing the method and a particular construction of article as produced thereby, I do not wish to be understood as intending to limit my invention thereto as the method may be practiced in other ways and by other forms of apparatus and for producing other forms of articles without departing from the spirit of the invention. Furthermore, while I have shown a particular construction of apparatus embodying my invention and a particular form of article within my invention, I do not wish to be understood as intending to limit the invention thereto as the apparatus and article may be variously modified and altered and the invention embodied in other forms of structures without departing from the spirit of my invention.

What I claim as new, and desire to secure by Letters Patent, is:

1. Welding mechanism for manufacturing beams or columns comprising an assembling table having means to flatwise and horizontally support one of the members from which the beam or column is to be formed and means for independently supporting edgewise in a vertical plane in angular relation to said first-referred-to member a member to form a flange of the beam or column, and means for receiving the assembled members and welding them together.

2. Welding mechanism for manufacturing beams or columns comprising an assembling table having means to flatwise and substantially horizontally support one of the members from which the beam or column is to be formed and grooved rollers for supporting edgewise in the grooves thereof and in angular relation to said first-referred-to member and substantially vertically, a member to form a flange of the beam or column, and means for receiving the assembled members and welding them together.

3. Welding mechanism comprising an assembling table having means by which to separately engage and assemble in angular relation members to be welded together and from which the assembled members may be fed, and electrode mechanism for receiving said assembled members and operative to weld said members together, said means and said electrode mechanism being adjustable to accommodate the members from which articles of different cross dimensions are to be produced.

4. Welding mechanism for manufacturing beams or columns comprising an assembling table having means to flatwise and substantially horizontally support one of the members from which the beam or column is to be formed, means for supporting edgewise in angular relation to said first-referred-to member a member to form a flange of the beam or column, means for receiving the assembled members and welding them together, and means adapted to engage the upper edge of said edgewise supported member to prevent it from becoming upwardly displaced.

5. Welding mechanism for manufacturing beams or columns comprising an assembling table having means to flatwise and horizontally support the one of the members from which the web of the beam or column is to be formed and means for independently supporting edgewise in vertical planes in angular relation to said first-referred-to member and at opposite edges thereof members to form flanges of the beam or column, and means for receiving the assembled members and welding them together.

6. Welding mechanism for manufacturing beams or columns comprising an assembling table having means to flatwise and substantially horizontally support the one of the members from which the web of the beam or column is to be formed and grooved rollers for supporting edgewise in the grooves thereof and in angular relation to said first-referred-to member and substantially vertically at opposite edges thereof, members to form the flanges of the beam or column, and means for receiving the assembled members and welding them together.

7. Welding mechanism for manufacturing beams or columns comprising an assembling table having means to flatwise and horizontally support one of the members from which the beam or column is to be formed and means for supporting edgewise in angular relation to said first-referred-to member a member to form a flange of the beam or column, and electrode mechanism for receiving the assembled members and operative to weld said members together, said means and said electrode mechanism being adjustable to accommodate the members from which articles of different cross dimensions are to be produced.

8. Welding mechanism comprising electrodes for engaging face portions of members from which the web portion and a flange portion of a beam are to be formed and disposed in angular relation to each other, the flange-forming member having a rib on the face thereof opposite that engaged by the electrode and opposing an edge of said web-forming member, means for supplying current to said electrodes, and means engaged by said rib for aligning said rib and web-forming member.

9. Welding mechanism comprising electrodes for engaging face portions of members from which the web portion and a flange portion of a beam are to be formed and disposed in angular relation to each other, the flange forming member having a rib on the face thereof opposite that engaged by the electrode and opposing an edge of said web-forming member, means for supplying current to said electrodes, and means for aligning said rib and web-forming member comprising a member upon which said rib bears and means for forcing said rib against said last-named member.

10. Welding mechanism comprising electrodes for engaging face portions of members from which the web portion and a flange portion of a beam are to be formed and disposed in angular relation to each other, the flange-forming member having a rib on the face thereof opposite that engaged by the electrode and opposing an edge of said web-forming member, means for supplying current to said electrodes, the one of said electrodes engaging said web-forming member being in the form of a roll, and a rim carried by said roll and insulated therefrom for engagement with said rib to align the latter with said web-forming member.

11. Welding mechanism comprising electrodes for engaging face portions of members from which the web portion and a flange portion of a beam are to be formed and disposed in angular relation to each other, the flange-forming member having a rib on the face thereof opposite that engaged by the electrode and opposing an edge of said web-forming member, means for supplying current to said electrodes, the one of said electrodes engaging said web-forming member being in the form of a roll, and a rim carried by said roll and insulated therefrom for engagement with said rib to align the latter with said web-forming member, the structure presenting an annular groove between said roll and rim.

12. Welding mechanism comprising electrodes for engaging face portions of members from which the web portion and a flange portion of a beam are to be formed and disposed in angular relation to each other, the flange-forming member having a rib on the face thereof opposite that engaged by the electrode and opposing an edge of said web-forming member, means for supplying current to said electrodes, the one of said electrodes engaging said web-forming member being in the form of a roll, a rim carried by said roll and insulated therefrom for engagement with said rib to align the latter with said web-forming member, and means for holding said rib against said rim.

13. Welding mechanism comprising electrodes arranged to engage faces of members to be welded together along an edge portion of one thereof, means for supplying welding current to said electrodes, fluid-pressure means urging the one of said electrodes which engages the other of said members, in a direction to force said members together and presenting a stop operating during engagement of said last-referred-to electrode with the member under the action of said fluid pressure means to limit the movement of said last-referred-to electrode under the continuing operation of said fluid pressure means.

14. In welding mechanism the combination of welding means comprising an electrode in the form of a roll, and means for causing side-by-side disposed members to be welded together to be spread into divergent condition in advance of the welding zone and one of said members to be bent in engagement with, and around, said roll.

15. Apparatus for welding substantially plate-like pieces to form structural shapes comprising a frame, a disc electrode journaled thereon for rotation in a vertical plane, a second disc electrode journaled on the frame for rotation in a horizontal plane, feeding and pressure rolls defining a welding throat through which pass the plate-like pieces assembled in edge to side, right-angle relationship for welding, and means for adjusting said electrodes toward and from the line of travel of the pieces through said throat, said throat being so disposed that the edges of said electrodes engage said pieces flatwise.

16. In an apparatus for welding flat plates to form structural shapes having a flange and web, planishing rolls adapted to engage the plates forming the flange and web, overlapping the joint therebetween, the edge of said rolls adjacent the inner section between the web and flange being rounded.

17. Apparatus for effecting continuous welding of a web-plate and a flange-plate having a longitudinal rudimentary rib to form a built-up structural member, comprising: means forming a welding-throat through which said plates may move with the edge of said rib presented to an edge of said web-plate, said means including a revoluble electrode engaging the outer surface of said flange-plate and a revoluble electrode spaced from the path of said flange-plate and engaging said web-plate; means whereby said electrodes are caused to press against said plates during advancement of said plates; and pressure-applying rolls between which said rib and the adjacent portion of said web-plate pass after leaving said electrodes, said pressure-applying rolls extending across the weld-seam.

18. Apparatus for effecting continuous welding of a web-plate and a flange-plate having a longitudinal rudimentary rib to form a built-up structural member, comprising: means forming a welding-throat through which said plates may move with the edge of said rib presented to an edge of said web-plate, said means including a revoluble electrode engaging the outer surface of said flange-plate and a revoluble electrode spaced from the path of said flange-plate and engaging said web-plate; means whereby said electrodes are caused to press against said plates during advancement of said plates; and pressure-applying rolls between which the weld-seam passes after leaving the electrodes, said rolls having rounded corners conforming to the junction between said rib and it flange-plate.

WILFRED SYKES.